(12) United States Patent
McColloch

(10) Patent No.: US 9,279,945 B2
(45) Date of Patent: Mar. 8, 2016

(54) METHODS, APPARATUSES AND SYSTEMS FOR BLIND MATING ARRAYS OF MULTI-OPTICAL FIBER CONNECTOR MODULES

(71) Applicant: Avago Technologies General IP (Singapore) Pte. Ltd., Singapore (SG)

(72) Inventor: Laurence R. McColloch, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 87 days.

(21) Appl. No.: 14/176,308

(22) Filed: Feb. 10, 2014

(65) Prior Publication Data

US 2015/0226924 A1 Aug. 13, 2015

(51) Int. Cl.
*G02B 6/38* (2006.01)
(52) U.S. Cl.
CPC ............ *G02B 6/3885* (2013.01); *G02B 6/3883* (2013.01); *G02B 6/3895* (2013.01)
(58) Field of Classification Search
CPC .................................................. G02B 6/3885
See application file for complete search history.

(56) References Cited

U.S. PATENT DOCUMENTS

| 2013/0108231 | A1 | 5/2013 | Mertesdorf |
| 2013/0205579 | A1 | 8/2013 | Mather et al. |
| 2015/0098680 | A1* | 4/2015 | Leigh et al. ..................... 385/88 |

OTHER PUBLICATIONS

Akito Nishimura, Tatsuya Ohta, Toru Arikawa and Yasuhiro Tamaki, Low Loss MPO Connector, Fujikura Technical Review, 2001, pp. 12-16.

* cited by examiner

*Primary Examiner* — Omar R Rojas

(57) ABSTRACT

Apparatuses, systems and methods are provided that enable a first array of multi-optical fiber connector modules disposed on a first structure to be blindly mated with a second array of multi-optical fiber connector modules disposed on a second structure. The arrays of modules are mounted on respective holders. One of the holders is mounted on the first structure and the other holder is mounted on the second structure. Engagement of the first and second structures with one another results in mating features of the holders being brought within a predetermined allowable misalignment tolerance of one another to ensure that the holders fully mate with one another. Mating of the holders with one another brings mating features of the connector modules of the arrays into a predetermined allowable misalignment tolerance of one another to ensure that full mating of the respective connector modules of the arrays occurs.

47 Claims, 18 Drawing Sheets

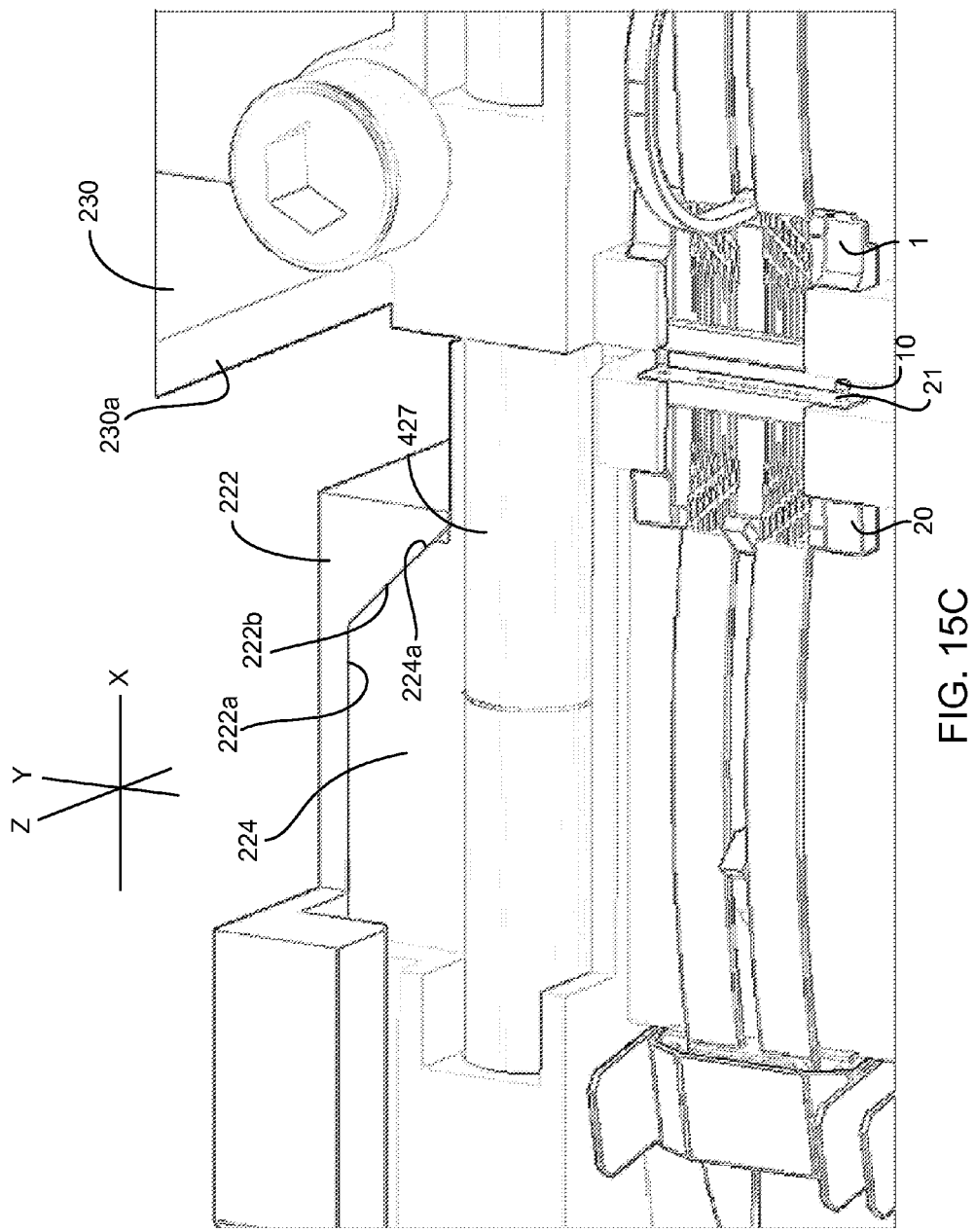

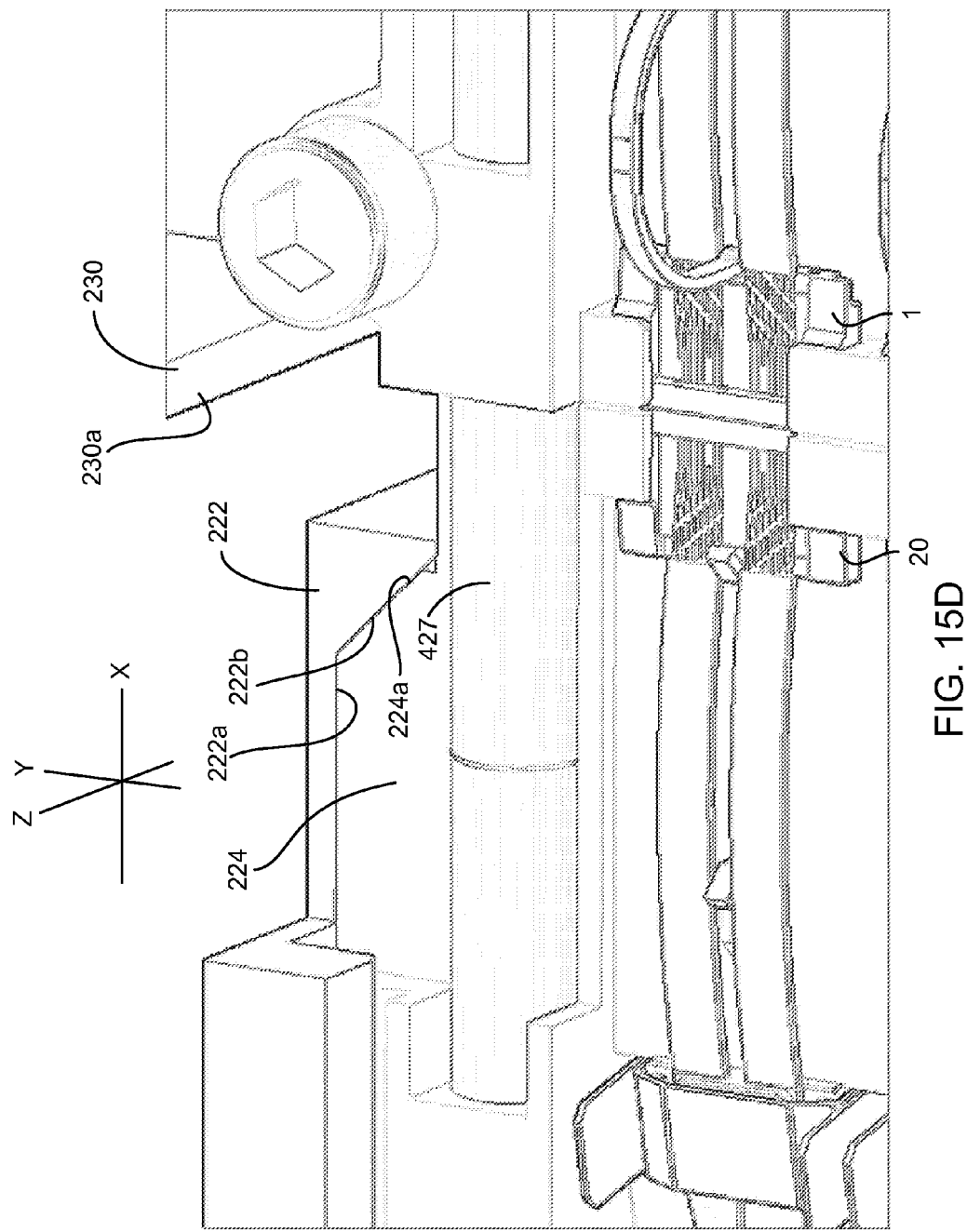

METHODS, APPARATUSES AND SYSTEMS FOR BLIND MATING ARRAYS OF MULTI-OPTICAL FIBER CONNECTOR MODULES

TECHNICAL FIELD OF THE INVENTION

The invention relates to optical communications. More particularly, the invention relates to methods and systems for blind mating arrays of multi-optical fiber connector modules.

BACKGROUND OF THE INVENTION

Multi-optical fiber connector modules are used to mechanically couple the ends of a plurality of optical fibers to a parallel optical communications module that has a plurality of optical channels. The parallel optical communications module may be a parallel optical transceiver module having both transmit and receive optical channels, a parallel optical transmitter module having only transmit optical channels, or a parallel optical receiver module having only receive optical channels. A typical multi-optical fiber connector module includes an optics system that couples light between the ends of the optical fibers and respective optoelectronic devices that are contained within the parallel optical communications module. For transmit optical channels, the optoelectronic devices are electrical-to-optical converters such as laser diodes or light-emitting diodes (LEDs). For receive optical channels, the optoelectronic devices are optical-to-electrical converters such as photodiodes.

The multi-optical fiber connector modules and the parallel optical communications modules typically have mating features on them that allow the multi-modules to be fixedly or removably mechanically coupled (i.e., mated) with one another. A variety of multi-optical fiber connector modules and parallel optical communications modules exist in the market today that are designed to mate with one another in a way that optically aligns the optical pathways between the ends of the optical fibers and the respective optoelectronic devices to enable optical data signals to be coupled between ends of the optical fibers and the respective optoelectronic devices. In designing and manufacturing the multi-optical fiber connector modules and the corresponding parallel optical communications modules, great care is taken to ensure that once the modules are mated together very precise optical alignment exists along the optical pathways.

A variety of passive and active optical alignment techniques and tools are used today to provide the precise optical alignment that is needed to prevent unacceptable optical losses from occurring. Unacceptable optical losses lead to signal degradation, which can lead to an unacceptable bit error rate (BER). When the multi-optical fiber connector modules and the corresponding parallel optical communications modules are manufactured, the manufacturing tolerances typically must be extremely tight in order to ensure that very precise optical alignment exists along the optical pathways when the modules are mated with one another in their ultimate relative positions and orientations. Otherwise, the optical alignment along the optical pathways will not have sufficient precision to prevent unacceptable optical losses from occurring. However, manufacturing the modules with very tight mechanical tolerances increases manufacturing costs, which increases the overall costs of the modules. In addition, the need to achieve very tight mechanical tolerances can lead to a decrease in yield for the modules, which also increases the overall costs of the modules.

Many connector modules are designed and manufactured to include passive alignment features, such as key/keyway mating features, which guide the modules into optical alignment with another mating module or receptacle as they are mechanically coupled together. For example, the opening in a receptacle guides a mating connector module into course alignment with the receptacle and then passive alignment features in the receptacle and on the connector module then mate to bring the optical pathways of the connector module into fine, or precise, optical alignment with the optical pathways of the receptacle. While such passive alignment features generally work well for their intended purposes, they are not suitable for simultaneous blind mating of multiple connector modules with multiple respective mating modules or receptacles.

For example, for a server box, or enclosure, that has multiple multi-fiber connector modules disposed on it that must be mated with corresponding multi-fiber connector modules disposed on a printed circuit board (PCB) of a backplane, the connector modules disposed on the server box, or enclosure, are individually and manually interconnected with the respective connector modules disposed on the backplane by optical cables. As examples, in the case of LC optical connectors, an LC-to-LC optical cable is used to make the interconnection whereas in the case of MTP® optical connectors, an MTP-to-MTP optical cable is used to make the interconnection. Making these interconnections can be a difficult and time-consuming task.

A need exists for methods, apparatuses and systems that enable a plurality of multi-optical fiber connector modules disposed on one structure to be simultaneously blind mated with another plurality of connector modules disposed on another structure, thereby obviating the need to individually and manually interconnect separate connector modules.

SUMMARY OF THE INVENTION

The invention is directed to apparatuses, systems and methods for blind mating arrays of multi-optical fiber connector modules. In accordance with an illustrative embodiment, the apparatus comprises a guide system, a first holder secured to the guide system, and a first 1-by-N array of first multi-optical fiber connector modules mounted on an upper surface of the first holder, where N is a positive integer that is equal to or greater than two. The first holder is movably secured to the guide system such that the first holder has limited freedom of movement relative to the guide system in at least one predetermined direction. The first holder has at least a first holder mating feature. Each of the first multi-optical fiber connector modules has at least a first passive fine alignment feature adapted to mate with a second passive fine alignment feature of a respective second multi-optical fiber connector module of a second 1-by-N array of second multi-optical fiber connector modules mounted on an upper surface of a second holder. The second holder has a second holder mating feature that is adapted to mate with the first holder mating feature of the first holder. The full mating of the first and second holder mating features with one another results in the full mating of the first and second fine alignment features of the respective first and second multi-optical fiber connector modules with one another. The full mating of the first and second fine alignment features of the respective first and second multi-optical fiber connector modules with one another precisely aligns respective optical pathways of the respective first multi-optical fiber connector module with respective optical pathways of the respective second multi-optical fiber connector module.

In accordance with another illustrative embodiment, the apparatus comprises a first holder and a first 1-by-N array of first multi-optical fiber connector modules mounted on an upper surface of the first holder, where N is a positive integer that is equal to or greater than two. The first holder has at least a first holder mating feature. The first holder has a 1-by-N array of sockets on its upper surface. Each of the first connector modules is held in a respective socket of the 1-by-N array of sockets in a floating arrangement that allows the respective first connector module to have limited freedom of movement relative to the respective socket. Each of the first connector modules has at least a first passive fine alignment feature adapted to mate with a second passive fine alignment feature of a respective second multi-optical fiber connector module of a second 1-by-N array of second multi-optical fiber connector modules mounted on an upper surface of a second holder. The second holder has a second holder mating feature that is adapted to mate with the first holder mating feature. The full mating of the first and second holder mating features with one another results in the full mating of the first and second fine alignment features of the respective first and second multi-optical fiber connector modules with one another. The full mating of the first and second fine alignment features of the respective first and second multi-optical fiber connector modules with one another precisely aligns respective optical pathways of the respective first multi-optical fiber connector module with respective optical pathways of the respective second multi-optical fiber connector module.

In accordance with an illustrative embodiment, the system comprises a guide system, a first holder secured to the guide system, and a first 1-by-N array of first multi-optical fiber connector modules mounted on an upper surface of the first holder, where N is a positive integer that is equal to or greater than two, a second holder, and a second 1-by-N array of second multi-optical fiber connector modules mounted on the upper surface of the second holder. The first holder is movably secured to the guide system such that the first holder has limited freedom of movement relative to the guide system in at least one predetermined direction. The first and second holders have at least first and second holder mating features, respectively, that are mated with one another. The connector modules of the first and second 1-by-N arrays have first and second passive fine alignment features, respectively, that are mated with one another. The mating of the first and second fine alignment features of the respective first and second multi-optical fiber connector modules with one another precisely aligns respective optical pathways of the respective first multi-optical fiber connector modules with respective optical pathways of the respective second multi-optical fiber connector modules.

In accordance with an illustrative embodiment, the method comprises:

providing a first structure having a first holder movably secured thereto via a guide system that provides the first holder with limited freedom of movement relative to the guide system in at least one predetermined direction;

providing a second structure having a second holder secured thereto;

engaging the first and second structures with one another such that first and second engagement mechanisms of the first and second structures, respectively, fully engage one another. The full engagement of the first and second engagement mechanisms with one another causes first and second holder mating features of the first and second holders to fully mate with one another. The full mating of the first and second holder mating features with one another causes first and second passive fine alignment features of the N first connector modules and of the N second connector modules, respectively, to fully mate with one another. The full mating of the first and second passive fine alignment features with one another precisely aligns respective optical pathways of the respective first multi-optical fiber connector modules with respective optical pathways of the respective second multi-optical fiber connector modules.

These and other features and advantages of the invention will become apparent from the following description, drawings and claims.

BRIEF DESCRIPTION OF THE DRAWINGS

FIGS. 15A-15D illustrate top perspective views of a molded hole of the holder shown in FIG. 8 being mated with a pin of the holder shown in FIG. 14 at various stages of the mating process.

DETAILED DESCRIPTION OF AN ILLUSTRATIVE EMBODIMENT

Figure 1:
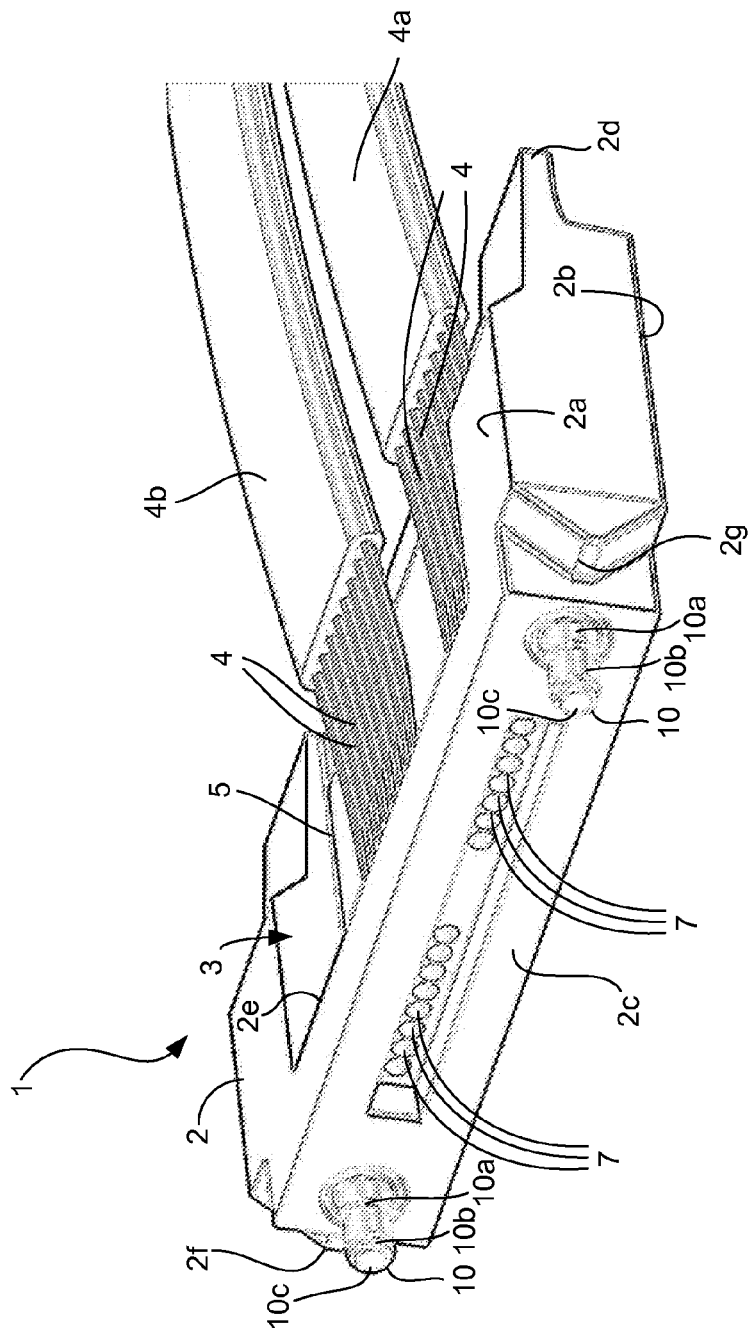
FIG. 1 illustrates a perspective view of a male multi-optical fiber connector module in accordance with an illustrative embodiment.

Embodiments of the invention include apparatuses, systems and methods that enable N female multi-optical fiber connector modules disposed on a first structure to be simultaneously blind mated with N male multi-optical fiber connector modules disposed on a second structure, where N is a positive integer that is equal to or greater than two. Enabling the male and female multi-optical fiber connector modules to blind mate with one another obviates the need to individually interconnect the modules with optical cables, as is the common practice. On one of the structures, a first holder is mounted that includes a 1×N array of female sockets. On each female socket of the array, a respective male or female multi-optical fiber connector module is mounted. Similarly, on the other structure, a second holder is mounted that includes a 1×N array of male sockets. On each male socket of the array, a respective male or female multi-optical fiber connector module is mounted.

The first and second holders have mating features thereon that enable the holders to mate with one another. The first structure may be, for example, a rack having at least one slot configured to receive a server box, or enclosure, in which case the second structure is the server enclosure itself. Engagement features on the first and second structures ensure that the structures engage one another within an allowable misalignment tolerance that brings the mating features of the first and second holders into contact with one another within a misalignment tolerance that ensures that the mating features of the holders will ultimately fully mate with one another. Mating of the mating features of the first and second holders with one another brings passive fine alignment features of the male and female connector modules into coarse alignment with one another within an allowable misalignment tolerance that will allow the passive fine alignment features to ultimately fully mate with one another. Once the passive fine alignment features of the male and female connector modules have been brought into coarse alignment with one another, the continued mating of the first and second holders with one another causes the passive fine alignment features of the respective male and female connector modules to fully mate with one another.

Thus, the act of engaging the structures with one another places the holders in their fully-mated state, which places the male and female connector modules in their fully-mated state. In the fully-mated state of the male and female connector modules, the optical pathways of the mated connector modules are in precise optical alignment with one another. In this way, the respective connector modules are blind mated with one another through the act of fully engaging the first and second structures with one another. Blind mating the respective connector modules with one another in this way eliminates the need to use optical cables or the like to optical interconnect the respective connector modules.

Examples of male and female multi-optical fiber connector modules that are suitable for use with the sockets and holders will be described with reference to FIGS. 1 and 2. Individual male and female sockets on which the male and female multi-optical fiber connector modules may be mounted will then be described with reference to FIGS. 3-7. Finally, the holders that hold the 1×N arrays of multi-optical fiber connector modules, and the structures on which the holders may be mounted, will be described with reference to FIGS. 8-15D. Like reference numbers in the figures represent like elements, features, or components. The features in the drawings are not necessarily drawn to scale.

FIG. 1 illustrates a perspective view of the male multi-optical fiber connector module, or lens, 1 in accordance with an illustrative embodiment. The male multi-optical fiber connector module 1 comprises a module housing 2 having an upper surface 2a, a lower surface 2b a front surface 2c, a back end 2d. A cavity 3 is formed in the upper surface 2a for receiving ends of a plurality of optical fibers 4 of two optical fiber cables 4a and 4b. In accordance with this illustrative embodiment, there are a total of sixteen optical fibers 4 and the multi-fiber connector module 1 has sixteen respective optical pathways, although the invention is not limited with respect to the number of optical fibers that are connected to the connector module 1 or the number of optical channels that are provided in the connector module 1. The module housing 2 is typically a molded, unitary plastic part, although the invention is not limited with respect to the composition of the module housing 2.

The multi-optical fiber connector module 1 has features that are similar or identical to features of a multi-optical fiber connector module that is disclosed in U.S. Pat. No. 7,543,994 (hereinafter the '994 patent) and U.S. Pat. No. 7,553,091 (hereinafter the '091 patent), which are assigned to the assignee of the present application and which are incorporated by reference herein in their entireties.

As can be seen in FIG. 1, the upper surface 2a of the module housing 2 has a cavity 3 formed therein. The cavity 3 functions as an optical fiber holding chamber for holding the ends of the optical fibers 4. The cavity 3 has a lower surface in which a plurality of grooves (not shown) are formed. Each groove is V-shaped. Prior to securing the ends of the optical fibers 4 within the cavity 3, each optical fiber 4 is cleaved and then a portion of the jacket is removed, leaving an unjacketed fiber end portion. The unjacketed fiber end portions of the fibers 4 are positioned within the respective grooves of the cavity 3. A refractive index matching (RIM) epoxy 5 that is transparent to the primary wavelength of the optical signals being carried on the optical fibers 4 is dispensed into the cavity 3. The RIM epoxy 5 fills any imperfections in the cleaved ends of the optical fibers 4, thereby making the joints transparent to the optical beams so that no internal reflection occurs at this boundary. When the epoxy 5 is dispensed into the cavity 3, it flows between, and is in contact with, the bottom and side walls of the cavity 3 and with the unjacketed fiber end portions. When the epoxy 5 cures and becomes hardened, it fixedly secures the ends of the unjacketed fiber end portions within the respective V-shaped grooves.

The ends of the unjacketed fiber end portions are adjacent to, or in contact with, the wall 2e of the module housing 2. The wall 2e of the module housing 2 is one of the side walls that define the cavity 3. Respective openings are formed in the module housing 2 that extend in the axial directions of the grooves from the cavity 3 through the wall 2e and through a front surface 2c of the module housing 2. Within these openings, respective collimating lenses 7 are disposed in or in proximity to the front surface 2c of the module housing 2. First and second passive fine alignment features 10 extend from the front surface 2c of the module housing 2. The passive fine alignment features 10 are identical in structure to one another and have stepped cylindrical shapes made up of first and second cylindrical portions 10a and 10b, where the first cylindrical portion 10a has a diameter that is greater than a diameter of the second cylindrical portion 10b. The passive fine alignment features 10 are rounded where they transition from the second cylindrical portions 10b to their ends 10c. The passive fine alignment features 10 are designed to mate with respective openings formed in another module (not shown), as will be described below in more detail.

Figure 2:
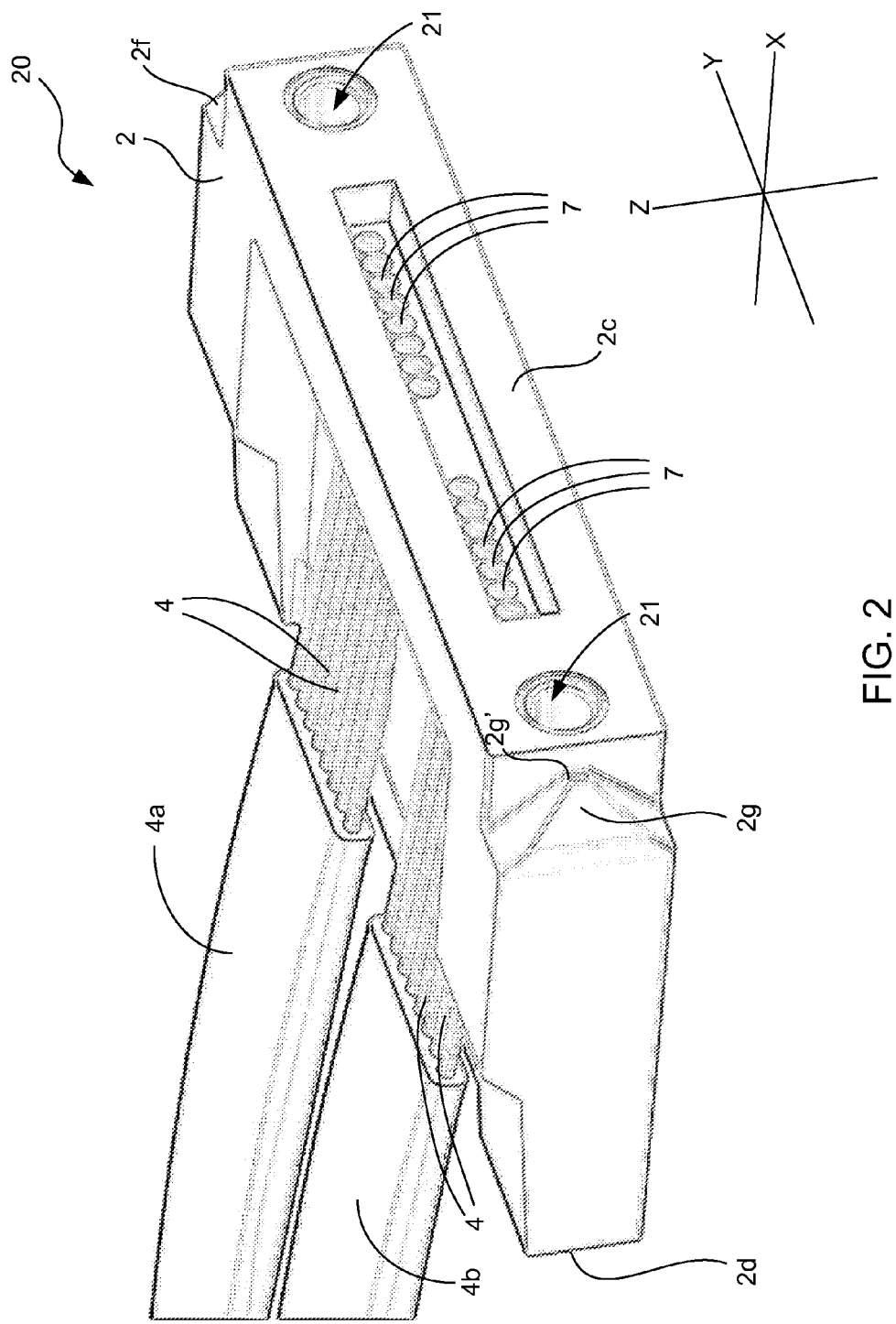
FIG. 2 illustrates a perspective view of a female multi-optical fiber connector module in accordance with an illustrative embodiment designed to mate with the male

FIG. 2 illustrates a perspective view of the female multi-optical fiber connector module, or lens, 20 designed to mate with the male multi-optical fiber connector module 1 shown in FIG. 1. The module 20 has a module housing 2 that is identical to the module housing 2 shown in FIG. 1 except that the module housing 2 shown in FIG. 2 has openings 21 formed therein that are complementary in shape to the passive fine alignment features 10 of the module 1 shown in FIG. 1. As will be described below in more detail, when the alignment features 10 of the module 1 are aligned with the respective alignment features 21 of the modules 20 and the surfaces 2c of the modules 1 and 20 are brought into contact with one another, the alignment features 10 mate with the respective alignment features 21. When the modules 1 and 20 are in this fully-mated configuration, the collimating lenses 7 of the modules 1 and 20 are in precise optical alignment with one another and the optical pathways (not shown) of the modules 1 and 20 are in precise optical alignment with one another. Thus, the full mating of the passive fine alignment features 10 and 21 effectuates the aforementioned fine alignment process. It should be noted that the invention is not limited to the multi-optical fiber connector modules described above with reference to FIGS. 1 and 2. The multi-optical fiber connector modules described above with reference to FIGS. 1 and 2 are merely examples of modules that are suitable for use with the invention.

Figure 3:
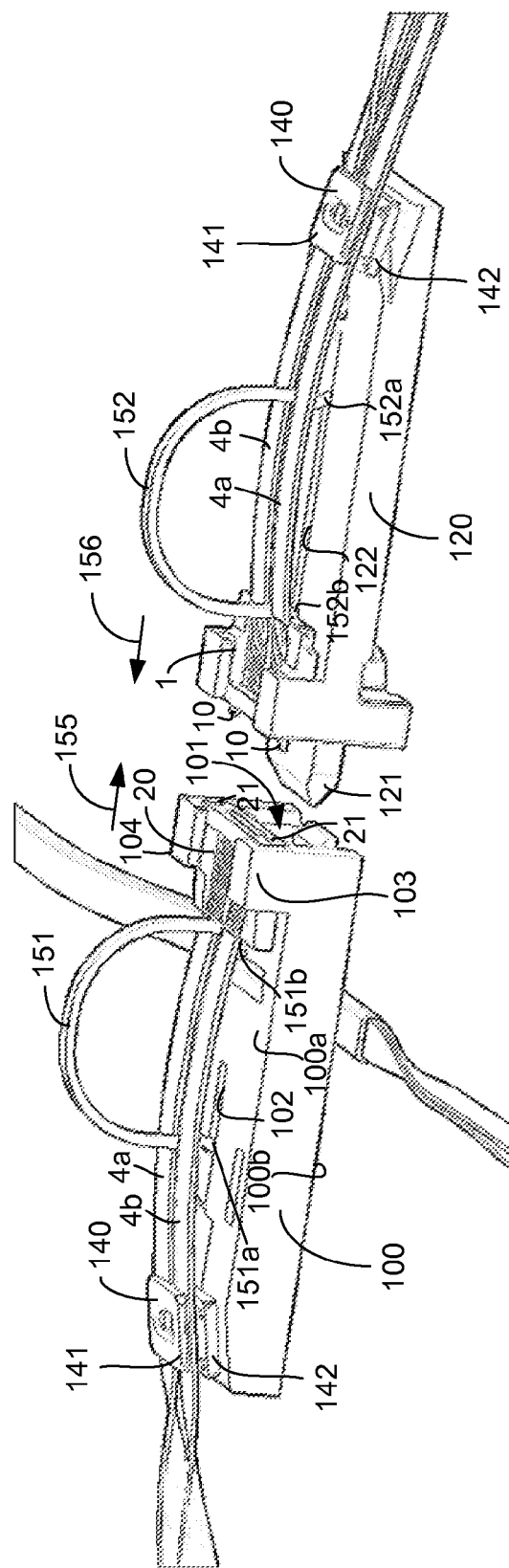
FIG. 3 illustrates a perspective view of a female socket in accordance with an illustrative embodiment on which the female multi-optical fiber connector module shown in FIG. 2 is mounted about to be mated with a male socket on which the male multi-optical fiber connector module shown in FIG. 1 is mounted.

FIG. 3 illustrates a perspective view of an illustrative embodiment of female and male sockets 100 and 120 on which the female and male multi-optical fiber connector modules 20 and 1 shown in FIGS. 1 and 2, respectively, may be mounted. The sockets 100 and 120 are examples of individual sockets on which the connector modules shown in FIGS. 1 and 2 may be mounted, which would then allow the sockets to be mounted on respective structures such that engagement of the structures with one another will result in mating of the sockets 100 and 120 with one another, which further results in mating of the connector modules 20 and 1 with one another. As will be described below with reference to FIGS. 8-15D, holders on which respective arrays of the connector modules 1 and 20 are mounted can be mounted on respective structures such that engagement of the structures with one another will result in mating of the holders with one another. In turn, mating of the holders with one another will result in mating of the respective arrays of the connector modules 20 and 1 with one another. The holders incorporate features that are similar or identical to features of the sockets 100 and 120 for holding the connector modules 1 and 20 of the arrays, and therefore an understanding of these features of the sockets 100 and 120 is helpful to understanding similar or identical features of the holders.

With reference to FIG. 3, the female socket 100 has a receptacle 101 formed therein that is shaped and sized to mate with a tongue 121 of the male socket 120. Engagement of the tongue 121 with the receptacle 101 brings the multi-optical fiber connector modules 1 and 20 into coarse alignment with one another such that the passive fine alignment features 10 and 21 of the modules 1 and 20, respectively, begin to engage one another. As the tongue 121 and the receptacle 101 continue to engage one another, the passive fine alignment features 10 and 21 of the modules 1 and 20, respectively, continue to engage one another to bring the modules 1 and 20 into fine alignment with each other. Thus, full mating of the tongue 121 and the receptacle 101 results in full mating of the modules fine alignment features 10 and 21 to bring the modules 1 and 20 into precise optical alignment with one another.

Providing the passive fine alignment features 10 with the stepped cylindrical shape shown in FIG. 1 provides some advantages over using long tapered pins. Long tapered pins being inserted into the respective reciprocally-shaped tapered openings have a tendency to stick due to the nearly-continuous contact that occurs between the surfaces of the pins and the respective openings as they engage one another. If sticking occurs, it is possible that the respective passive fine alignment features will not fully engage one another, which can result in less than perfect alignment. One advantage of the stepped passive fine alignment features 10 is that there is less of a tendency to stick during insertion into the respective openings due to there being less surface-to-surface contact during insertion. This feature ensures that full mechanical coupling will occur, which ensures that precise optical alignment will be achieved. Another advantage is that the stepped cylindrical shapes are easier and less costly to manufacture than tapered shapes. As stated above, however, the invention is not limited with respect to the shapes and configurations of the modules 1 and 20.

In the illustrative embodiment shown in FIG. 3, the sockets 100 and 120 also have respective cleave holders 140 mounted thereon that are identical in structure and dimensions. In accordance with an illustrative embodiment, the cleave holder 140 is secured to the fibers 4 before the modules 1 and 20 are secured to the ends of the fibers 4 and is used to hold the fibers 4 as they are being cleaved to desired lengths and stripped of their jackets. The cleave holder 140 remains secured to the fibers 4 after the modules 1 and 20 have been assembled and secured to the stripped and cleaved ends (not shown) of the fibers 4. The cleave holder 140 typically comprises a molded plastic body having an upper portion 141 and a lower portion 142 that are interconnected by a central portion (not shown) such that the upper portion 141, the lower portion 142 and the central portion form an I-shaped body. The central portion of the I-shaped body separates the upper and lower portions 141 and 142 by a distance that provides a space on each side of the central portion into which the cables 4a and 4b are inserted. The cables 4a and 4b are secured to the upper and lower portions 141 and 142 by an adhesive material. Once the cables 4a and 4b are secured to the cleave holder 140 in this manner, the combined effect of the adhesive bond and being sandwiched in between the upper and lower portions 141 and 142 retains the cables 4a and 4b in place.

With the fibers 4 fixedly secured in position within the cleave holder 140, and with the cleave holder body 141 mounted on a stripper and cleaver tool, the fibers 4 are stripped and the ends are cleaved with very high precision such that the length of the fibers 4 from a particular location in the cleave holder 140 to the fiber end faces is equal to a very precise, predetermined value. Once the fibers 4 have been secured in place within the cleave holders 140, the cleave holders 140 are mounted on the sockets 100 and 120 such that pins (not shown) disposed on the sockets 100 and 120 are received in respective holes (not shown) of the lower portion 142 of the cleave holders 140. An adhesive material such as glue may be used to fixedly secure the cleave holders 140 to the sockets 100 and 120. The cleave holders 140 provide strain relief for the fibers 4.

Springs 151 and 152 are mechanically coupled to the sockets 100 and 120, respectively, via slots 102 and 122, respectively, formed in the sockets 100 and 120, respectively. Proximal ends 151a and 152a of the springs 151 and 152, respectively, are immovable whereas distal ends 151b and 152b of the springs 151 and 152, respectively, are free to move within the respective slots 102 and 122. The distal ends 151b and 152b of the springs 151 and 152 are in contact with the back ends 2d (FIGS. 1 and 2) of the module housings 2. The forces of the springs 151 and 152 in their loaded states shown in FIG. 3 urge the modules 20 and 1, respectively in the directions indicated by arrows 155 and 156, respectively, until the modules 20 and 1 abut tapered stops (not shown) formed in the sockets 100 and 120 that prevent further movement of the modules 20 and 1 in the directions of arrows 155 and 156, respectively. These tapered stops are described below in more detail.

Figure 4:
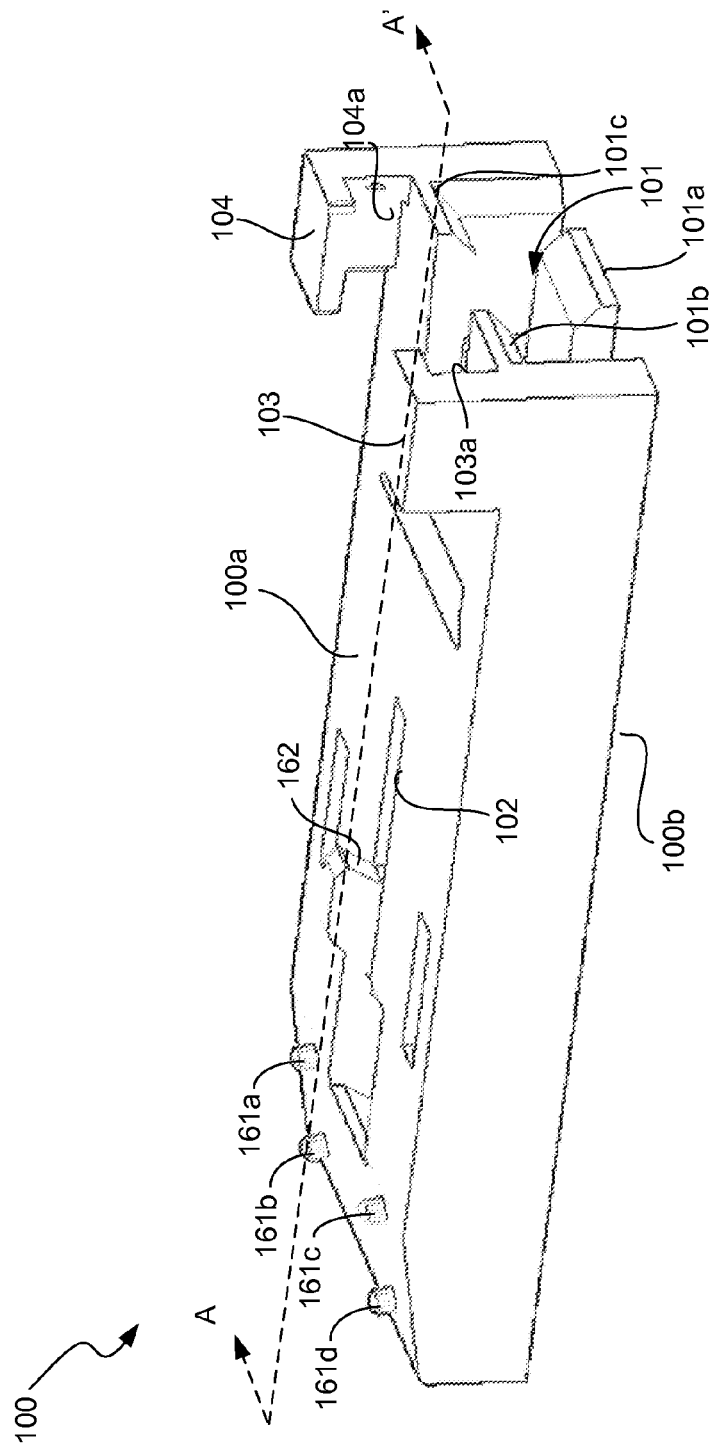
FIG. 4 illustrates a perspective view of the female socket shown in FIG. 3 with the module, the cleave holder and the spring removed.

FIG. 4 illustrates a perspective view of the female socket 100 shown in FIG. 3 with the module 20, the cleave holder 140 and the spring 151 removed. The receptacle 101 of the socket 100 has alignment features 101a, 101b and 101c therein that define the shape of the receptacle 101. The alignment feature 101a, which defines a bottom of the receptacle 101, tapers upwardly such that it is smaller in width at the entrance of the receptacle 101 and gradually increases in width to a constant width once inside of the receptacle 101. The alignment features 101b and 101c taper downwardly such that they are smaller in width at the entrance of the receptacle 101 and gradually increase in width to a constant width once inside of the receptacle 101. The combined effect of the tapered alignment features 101a is to provide the receptacle 101 with a wider opening at its entrance that gradually decreases to a smaller, constant width once inside of the receptacle 101. The manner in which these alignment features 101a-101c engage the tongue 121 of socket 120 shown in FIG. 3 is described below in more detail.

The socket 100 has an upper surface 100a and a lower surface 100b. A plurality (e.g., four) of pins 161a-161d are disposed on the upper surface 100a for mating with openings (not shown) formed in the lower portion 142 (FIG. 3) of the cleave holder 140 (FIG. 3). The openings formed in the lower portion 142 of the cleave holder 140 are complementary in shape and size to the shape and size of the pins 161a-161d. It can be seen from FIG. 3 that the portions of the fibers 4 that extend in between the cleave holders 140 and the modules 1 and 100 have some slack in them to provide strain relief for the ends of the fibers 4 that are secured to the modules 1 and 100.

A stop 162 (FIG. 4) disposed at the back end of the slot 102 abuts the proximal end 151a of the spring 151 to prevent the proximal end 151a of the spring 151 from moving in the rearward direction of the socket 100 (i.e., in the direction opposite the direction of arrow 155). This stop 162 enables the spring 151 to be loaded to exert a force on the module 20 that urges the module 20 in the direction of arrow 155. The module 20 sits on the upper surface 100a of the socket 100 and is urged forward by the spring 151 into contact with side arms 103 and 104 of the socket 100. As will be described below in more detail, the arms 103 and 104 have tapered stops (not shown) formed on their inner walls 103a and 104a (FIG. 4) that prevent further forward movement of the module 20 in the direction of arrow 155 (FIG. 3). The inner walls 103a and 104a are identical to one another and are complementary in shape to the shapes of side chamfers 2f and 2g (FIG. 2) disposed on opposite sides of the module housing 2. As will be described below in more detail, these tapered stops mate with, but are slightly larger than, the chamfers 2f and 2g to allow some freedom of movement of the module 20 when it is in the forward position shown in FIG. 3.

Figure 5:
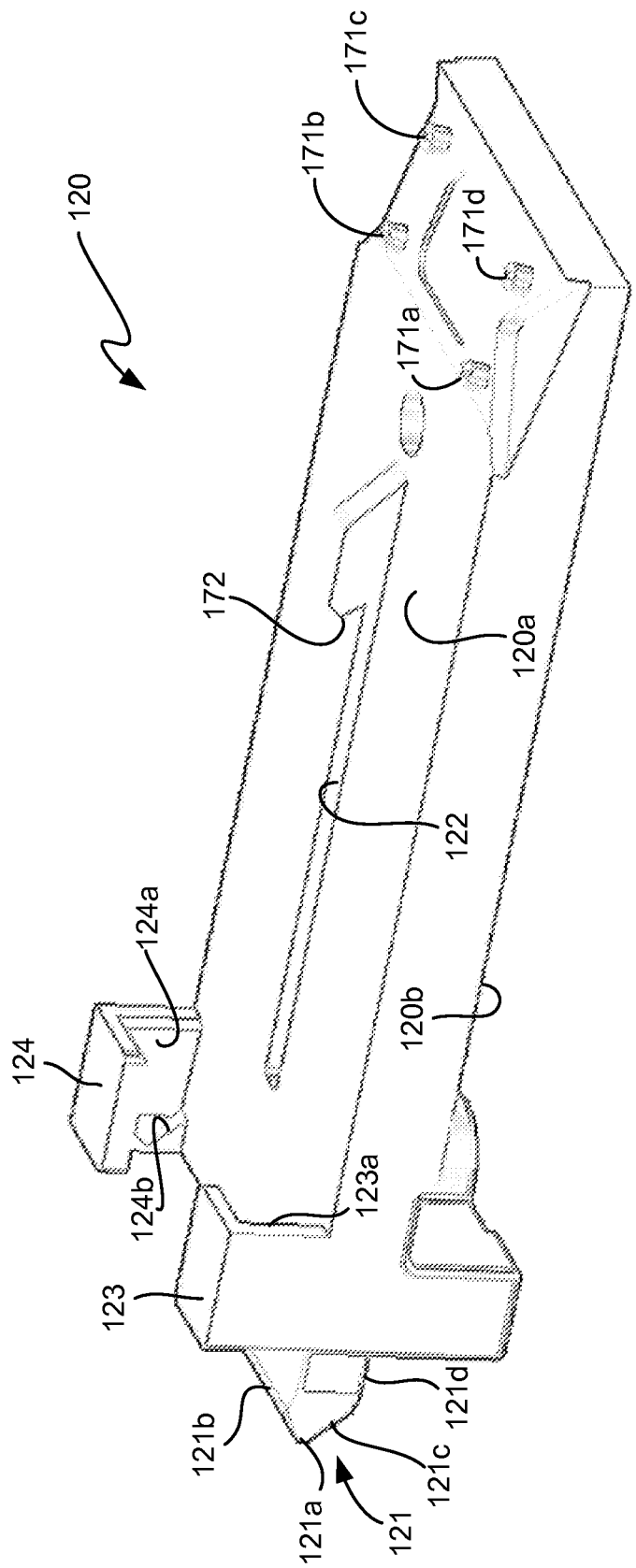
FIG. 5 illustrates a perspective view of the male socket shown in FIG. 3 with the module, the cleave holder and the spring removed.

FIG. 5 illustrates a perspective view of the male socket 120 shown in FIG. 3 with the module 1, the cleave holder 140 and the spring 152 removed. The tongue 121 of the socket 120 constitutes an alignment feature that is complementary in shape and size to the shape and size of the inner surfaces of the receptacle 101 defined by the alignment features 101a-101c (FIG. 4). Starting at a tip 121a of the tongue 121, the tongue 121 has an upwardly tapering portion 121b and downwardly tapering portion 121c that gradually taper the width of the tongue from a smaller width at the tip 121a to a larger, constant width at a portion 121d of the tongue. This constant width is equal to the constant-width inside of the receptacle 101.

The socket 120 has an upper surface 120a and a lower surface 120b. A plurality (e.g., four) of pins 171a-171d are disposed on the upper surface 120a for mating with openings (not shown) formed in the lower portion 142 (FIG. 3) of the cleave holder 140 (FIG. 3). The openings formed in the lower portion 142 of the cleave holder 140 are complementary in shape and size to the shape and size of the pins 171a-171d. A stop 172 (FIG. 5) disposed at the back end of the slot 122 abuts the proximal end 152a of the spring 152 to prevent the proximal end 152a of the spring 152 from moving in the rearward direction of the socket 120 (i.e., in the direction opposite the direction of arrow 156). This stop 172 enables the spring 152 to be loaded to exert the force on the module 1 (FIG. 3) that urges the module 1 in the direction of arrow 156. The module 1 sits on the upper surface 120a of the socket 120 and is urged forward by the spring 152 into contact with side arms 123 and 124 of the socket 100. As will be described below in more detail, the arms 123 and 124 have tapered stops formed on their inner walls 123a and 124a (FIG. 5), respectively, that prevent further forward movement of the module 1 in the direction of arrow 156 (FIG. 3). One of these tapered stops 124b is visible in FIG. 5. The inner walls 123a and 124a are identical to one another and are complementary in shape to the shapes of side chamfers 2f and 2g (FIG. 1) disposed on opposite sides of the module housing 2. As will be described below in more detail, these tapered stops engage the chamfers 2f and 2g to restrict the movement of the module 1 when it is in the forward position shown in FIG. 3.

With reference again to FIG. 3, when the sockets 100 and 120 are coarsely aligned with one another such that the tongue 121 and the receptacle 101 are in coarse alignment with one another (e.g., within 50 mils in any direction of precise alignment), continued movement of the sockets 100 and 120 toward one another will ultimately result in the sockets 100 and 120 fully mating with one another. In other words, the tapered surfaces of the tongue 121 and of the receptacle 101 allow for some misalignment of the sockets 100 and 120 (e.g., 50 mils of misalignment in any direction) while still ensuring that the tongue 121 and the receptacle 101 will engage one another and ultimately mate with one another. This allows the sockets 100 and 120 to blind mate with one another provided they are only misaligned with one another within some tolerance, e.g., 50 mils.

As the sockets 100 and 120 are coarsely aligned with one another and moved toward one another, the alignment features 10 of the male socket 1 will begin to initially engage the alignment features 21 of the female socket 20. Even if the sockets 100 and 120 are misaligned within some tolerance, e.g., 50 mils, but close enough to one another that the modules 1 and 20 are in contact with one another, the alignment features 10 of module 1 will begin to engage the alignment features 21 of module 20. Once the alignment features 10 and 21 begin to engage one another, continued movement of the sockets 100 and 120 toward one another will cause the alignment features 10 and 21 to continue to engage one another until they are in the fully-mated state. In the fully-mated state of the alignment features 10 and 21, the modules 1 and 20 are in precise (i.e., fine) alignment with one another such that their optical pathways are precisely aligned. Thus, blind mating of the sockets 100 and 120 within the misalignment tolerance ultimately results in fine alignment of the modules 1 and 20.

Figure 6:
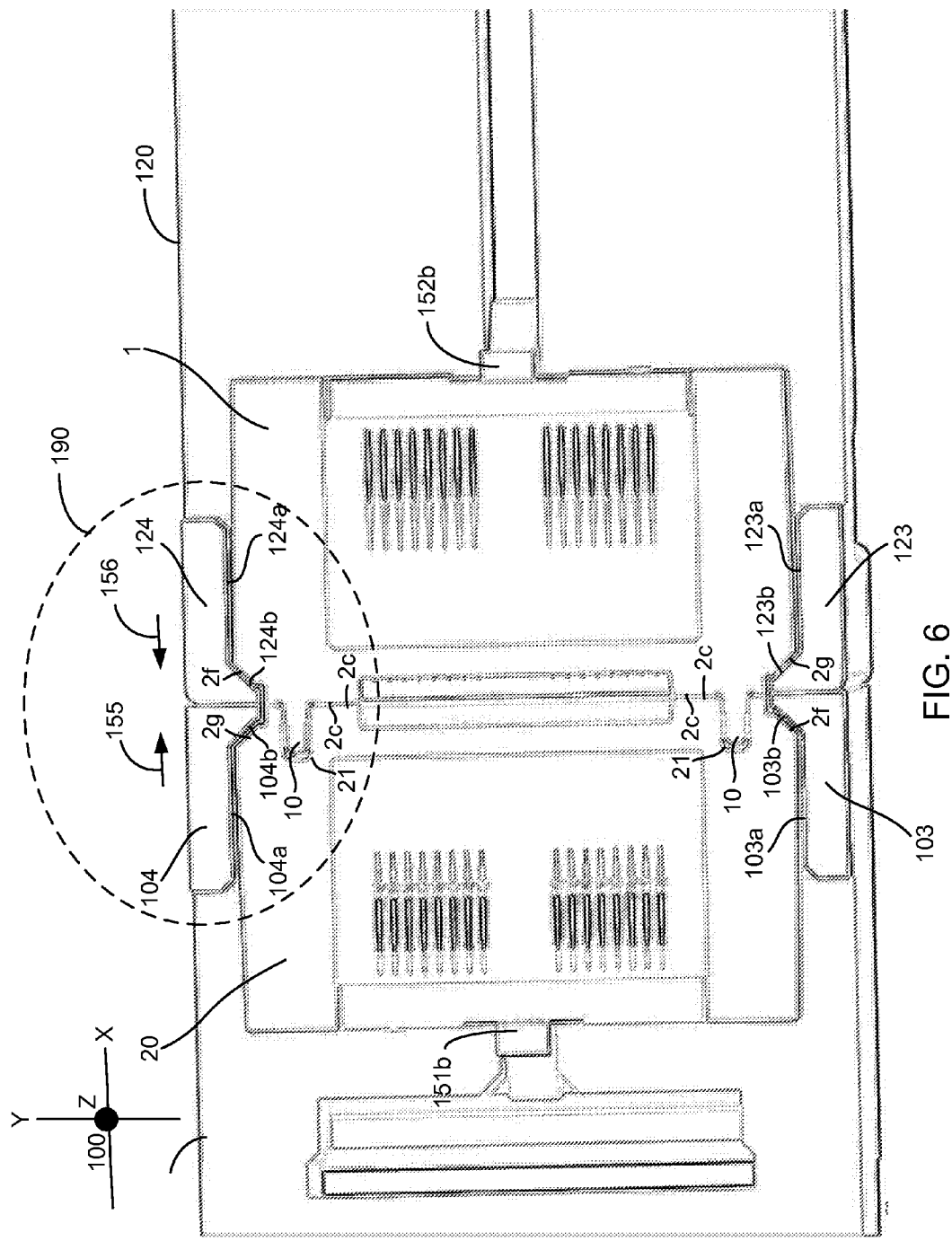
FIG. 6 illustrates a section showing the top view of the sockets and the modules shown in FIG. 3 in the fully-mated state.

FIG. 6 illustrates a top view of the sockets 100, 120 and the modules 1, 20 shown in FIG. 3 in the fully-mated state. In FIG. 6, top portions of the arms 103, 104, 123 and 124 have been removed to allow the interaction between the chamfers 2g of the modules 1 and 20 and the tapered stops 103b, 104b, 123b and 124b formed on the inner walls 103a, 104a, 123a and 124a of the arms 103, 104, 123 and 124, respectively, to be clearly seen. With reference to FIG. 2, the shape of the chamfers can be clearly seen by looking at chamfer 2g. The chamfer 2g thins in the Y and Z dimensions as it nears the front surface 2c of the module 20. At the location where the chamfer 2g ends near the front surface 2c, the chamfer 2g converges in the Y and Z dimensions to an apex 2g'.

With reference again to FIG. 6, the portions of the inner walls 103a, 104a, 123a and 124a that form the tapered stops 103b, 104b, 123b and 124b, respectively, are complementary in shape to the shapes of the respective chamfers 2f and 2g, but the chamfers 2f and 2g are slightly smaller in size than the respective tapered stops 103b, 104b, 123b and 124b in the X, Y and Z dimensions. This size difference allows some freedom of movement of the modules 1 and 20 relative to the sockets 120 and 100, respectively, in the X, Y and Z dimensions as the sockets 100 and 120 and the modules 1 and 20 are engaging one another. The distal ends 151b and 152b of the springs 151 and 152, respectively, urge the modules 1 and 20 toward one another causing their front surfaces 2c to come into contact with one another. The opposing forces provided by the springs 151 and 152 and the space in between chamfers 2f and 2g and the respective tapered stops 103b, 104b, 123b and 124b allow the modules 1 and 20 to float, or move, to a limited extent within their respective sockets 120 and 100 in the X, Y and Z directions, while also centering the modules 1 and 20 within their respective sockets 120 and 100 when the modules 1 and 20 are not in contact with one another.

The engagement of the tapered stops 103b, 104b, 123b and 124b with the respective chamfers 2f and 2g limits the extent to which the modules 1 and 20 are able to float, or move, within their respective sockets 120 and 100. Allowing the modules 1 and 20 to float to a limited extent within the sockets 120 and 100, respectively, ensures that the respective alignment features 10 and 21 will blindly engage one another and ultimately fully mate with one another when the respective sockets 100 and 120 are blind mated with one another.

Figure 7:
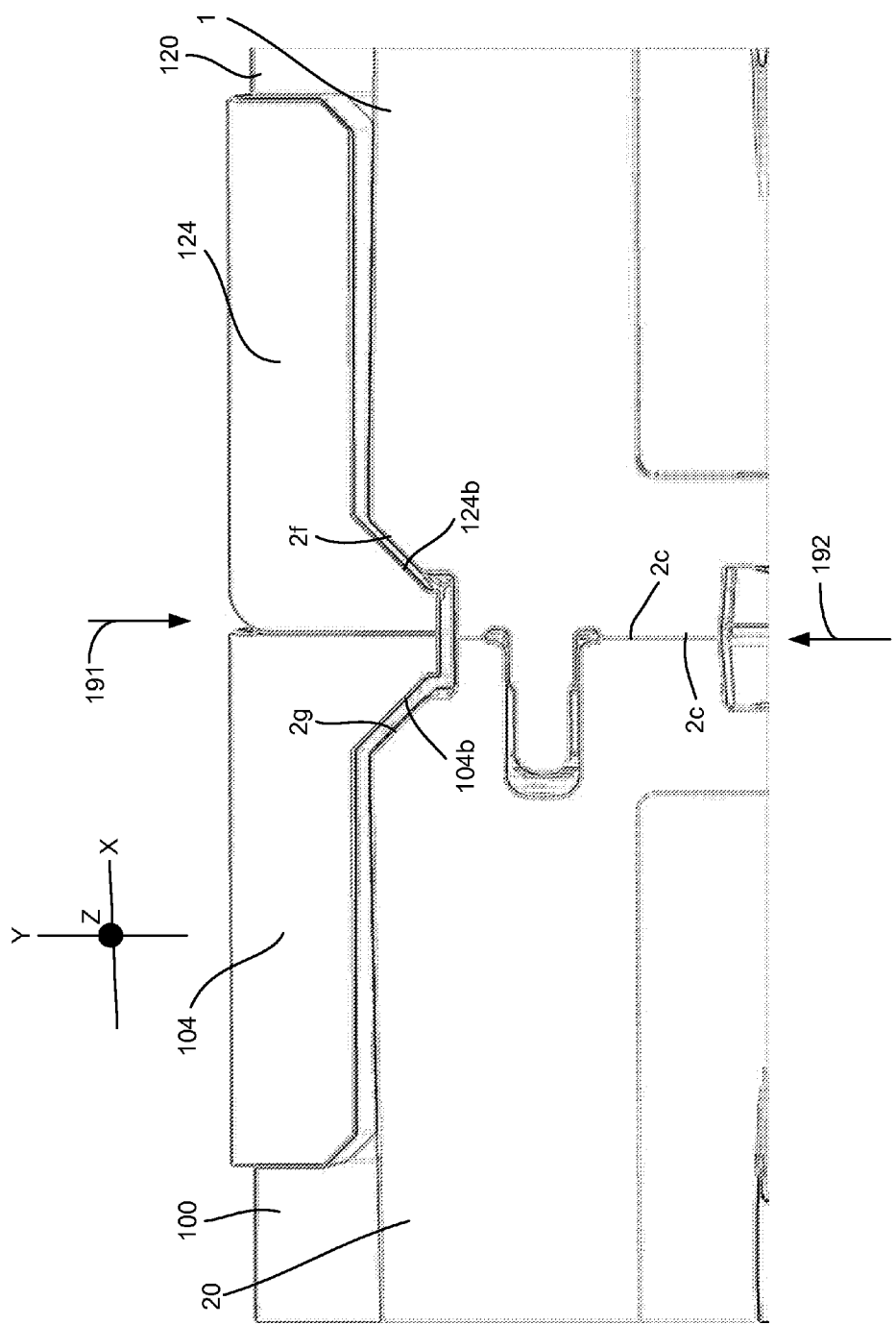
FIG. 7 illustrates a top perspective view of an expanded portion of the sectional view shown in FIG. 6 within the dashed circle labeled with reference numeral 190.

FIG. 7 illustrates a top perspective view of an expanded portion of the view shown in FIG. 6 within the dashed circle labeled with reference numeral 190. As the distal ends 151b and 152b of the springs 151 and 152 (FIG. 6) urge the sockets 100 and 120 forward into abutment with one another, the chamfers 2g and 2f slide along the tapered stops 104b and 124b, respectively. When the front surfaces 2c of the modules 1 and 20 are not in contact with one another (FIG. 3), the interaction of the tapered stops 104b and 124b with the chamfers 2g and 2f, respectively, directs the modules 20 and 1 in the Y direction indicated by arrow 191. Likewise, on the opposite side of the sockets 100 and 120 (FIG. 6), the interaction between the chamfers 2f and 2g and the tapered stops 103b and 123b (FIG. 6), respectively, directs the modules 20 and 1 in the opposite Y direction indicated by arrow 192 (FIG. 7). The combined effect of the chamfers 2g and 2f and the tapered stops 103b, 104b, 123b and 124b when the front surfaces 2c of the modules 1 and 20 are not in contact with one another is to align the modules 1 and 20 in the Y dimension within their respective sockets 120 and 100. Because the shapes of the chamfers 2g and 2f and the tapered stops 103b, 104b, 123b and 124b are also complementary in the Z dimension, the interaction between the chamfers 2g and 2f and the tapered stops 103b, 104b, 123b and 124b also has the effect of aligning the modules 1 and 20 within their respective sockets 120 and 100 in the Z dimension when the front surfaces 2c of the modules 1 and 20 are not in contact with one another.

When the front surfaces 2c of the modules 1 and 20 are not in contact with each other as shown in FIG. 3, the modules 1 and 20 are slightly proud of their respective sockets 120 and 100. In other words, the front surfaces 2c of the modules 1 and 20 are slightly forward of their respective sockets 120 and 100 in the directions indicated by arrows 156 and 155 (FIG. 3), respectively, when the front surfaces 2c of the modules 1 and 20 are not in contact with each other. The springs 151 and 152 urge the modules 20 and 1, respectively, into these forward positions. When the front surfaces 2c of the modules 1 and 20 are pressed against one another as shown in FIGS. 6 and 7, the forces exerted by the springs 152 and 151 on the modules 1 and 20, respectively, and the space in between the chamfers 2g and 2f and the respective tapered stops 103b, 104b, 123b and 124b allow the modules 1 and 20 to float, or move, to a limited degree within their respective sockets 120 and 100. However, the forces exerted by the springs 151 and 152 on the modules 20 and 1, respectively, and the interaction between the chamfers 2g and 2f and the respective tapered stops 103b, 104b, 123b and 124b also limit the freedom of movement of the modules 1 and 20 within their respective sockets 120 and 100 to predetermined alignment tolerances. This limited freedom of movement within predetermined alignment tolerances ensures that the alignment features 10 and 21 find one another, begin to engage one another and ultimately fully mate with one another to bring the modules 1 and 20 into precise optical alignment with one another.

Figure 8:
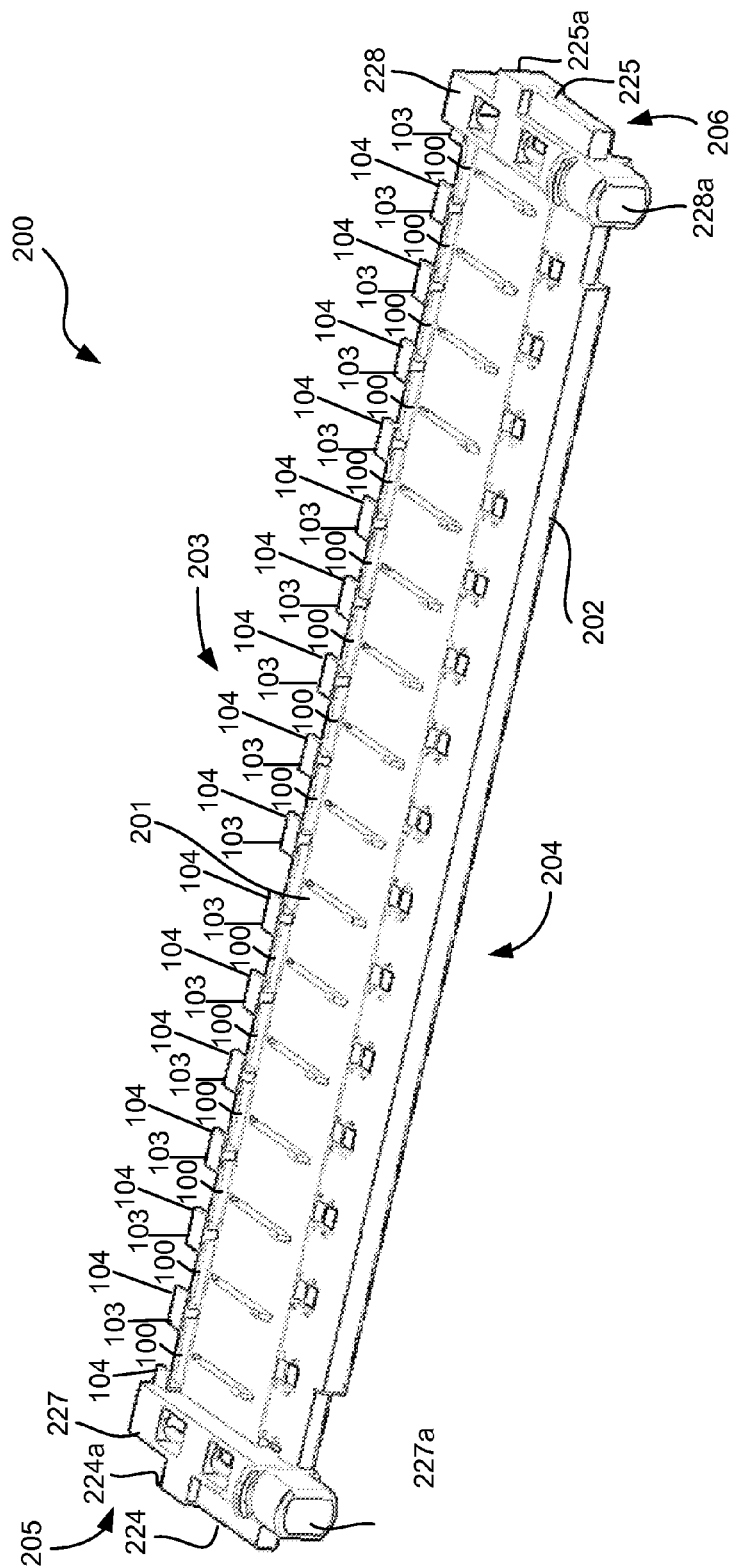
FIG. 8 illustrates a top perspective view of a holder that is adapted to hold a 1×N array of the male or female multi-optical fiber connector modules shown in FIGS. 1 and 2, respectively.

FIG. 8 illustrates a top perspective view of a holder 200 that is adapted to hold a 1×N array of the male or female multi-optical fiber connector modules 1 and 20 shown in FIGS. 1 and 2, although the holder 200 may be used with connector modules having designs that are different from those shown in FIGS. 1 and 2. For exemplary purposes, it will be assumed that the holder 200 holds a 1×N array of the female connector modules 20 shown in FIG. 2. As will be described below with reference to FIG. 14, a holder 400 that is adapted to mate with holder 200 holds a 1×N array of either the male or female connector modules 1 and 20, depending on whether the holder 200 is holding the male or the female connector modules 1 and 20. For exemplary purposes, it will be assumed that the holder 400 holds a 1×N array of the male connector modules 1 shown in FIG. 1. It will also be assumed for exemplary purposes that N=16, although N could be any value equal to or greater than two.

With reference to FIG. 8, the holder 200 is typically made of a hard molded plastic material. The holder 200 has an upper surface 201, a lower surface 202, a front side 203, a back side 204, a first end 205, and a second end 206. The upper surface 201 has N of the sockets 100 shown in FIG. 4 integrally formed therein side by side such that adjacent sockets 100 share side walls and the arms 103, 104. The sockets shown in FIG. 8 are identical to the socket 100 shown in FIG. 4 except that the sockets 100 shown in FIG. 8 do not include the openings 101 of the sockets 100 shown in FIG. 4. Because all of the other features of the sockets 100 shown in FIGS. 4 and 8 are identical, the same reference numerals that are used in FIG. 4 to identify features of the socket 100 are used in FIG. 8 to identify those same features.

Figure 9:
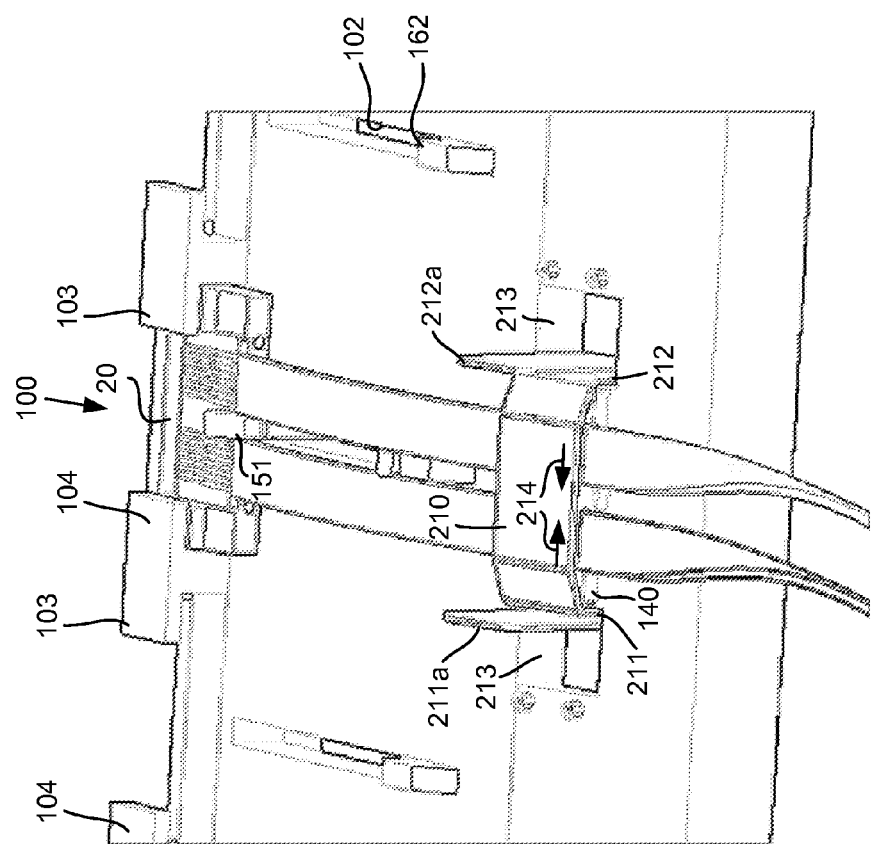
FIG. 9 illustrates a top perspective view of a portion of the holder shown in FIG. 8 with one of the female modules shown in FIG. 2 secured to a respective socket of the holder.

FIG. 9 illustrates a top perspective view of a portion of the holder 200 shown in FIG. 8 with one of the female modules 20 shown in FIG. 2 secured to the respective socket 100 of the holder 200. As with the embodiment shown in FIG. 3, a cleave holder 140 is secured to the socket 100 in the manner described above, except that a retaining spring clip 210 rather than an adhesive material is used to secure the cleave holder 140 to the socket 100. The spring clip 210 is generally U-shaped and is positioned upside down with the base of the U of the clip 210 pressing against the upper surface of the cleave holder 140 and the inner surfaces of the arms 211 and 212 of the clip 210 pressing against inner surfaces of openings 213 of the socket 100. The arms 211 and 212 of the U are folded and the folds loop back to provide tabs 211a and 212a that can be pinched together by a user in the directions indicated by arrows 214 to increase the distance in between the arms 211 and 212 to allow the arms 211 and 212 to be inserted into or extracted from the openings 213. When the user removes the pinching force, the spring force of the clip 210 causes the arms 211 and 212 to move toward one another to exert retaining forces on the cleave holder 140 and on the sides of the openings 213. With the pinching force exerted, the clip 210 can be extracted by lifting the clip 210 upward away from the socket 100 to lift the arms 211 and 212 out of the openings 213.

Like the socket 100 shown in FIG. 3, the sockets 100 of the holder 200 have respective slots 102 formed therein that restrain the movement of the respective springs 151 to the lengthwise directions of the slots 102. Only a portion of the spring 151 is visible in FIG. 9. The functions of the springs 151, the arms 103 and 104 of the sockets 100, and the chamfers 2g of the modules 20 have been described above with reference to FIGS. 2, 3, 4, 6 and 7, and therefore will not be described again with reference to FIG. 9. In general, these components or features cooperate to allow the modules 20 to float to a limited extent relative to the respective sockets 100, which is important to allowing the modules 20 to self-align with the modules 1 as they are mating with one another, as will be described below in more detail with reference to FIGS. 14-15D.

Figure 10:
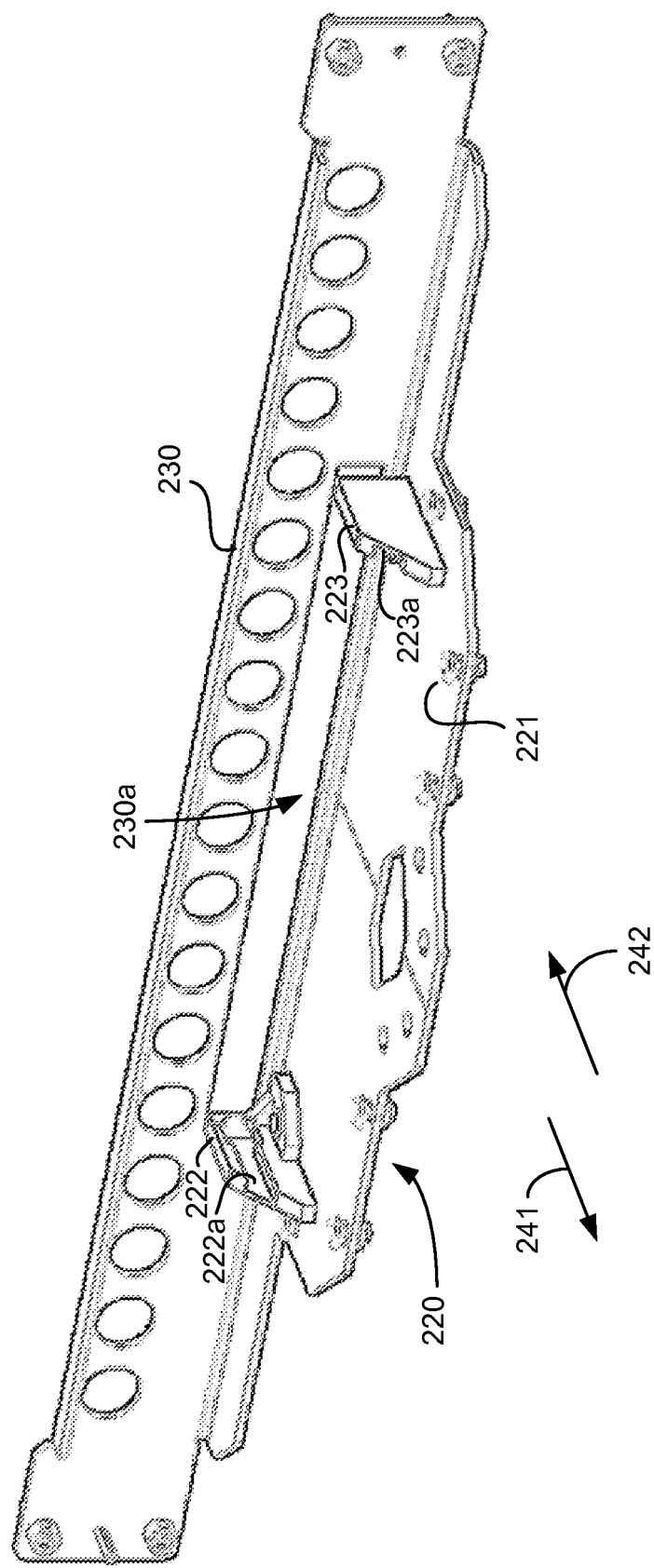
FIG. 10 illustrates a perspective view of a guide system attached to a cross bar of a rack (not shown) and adapted for supporting the holder shown in FIG. 8.
Figure 11:
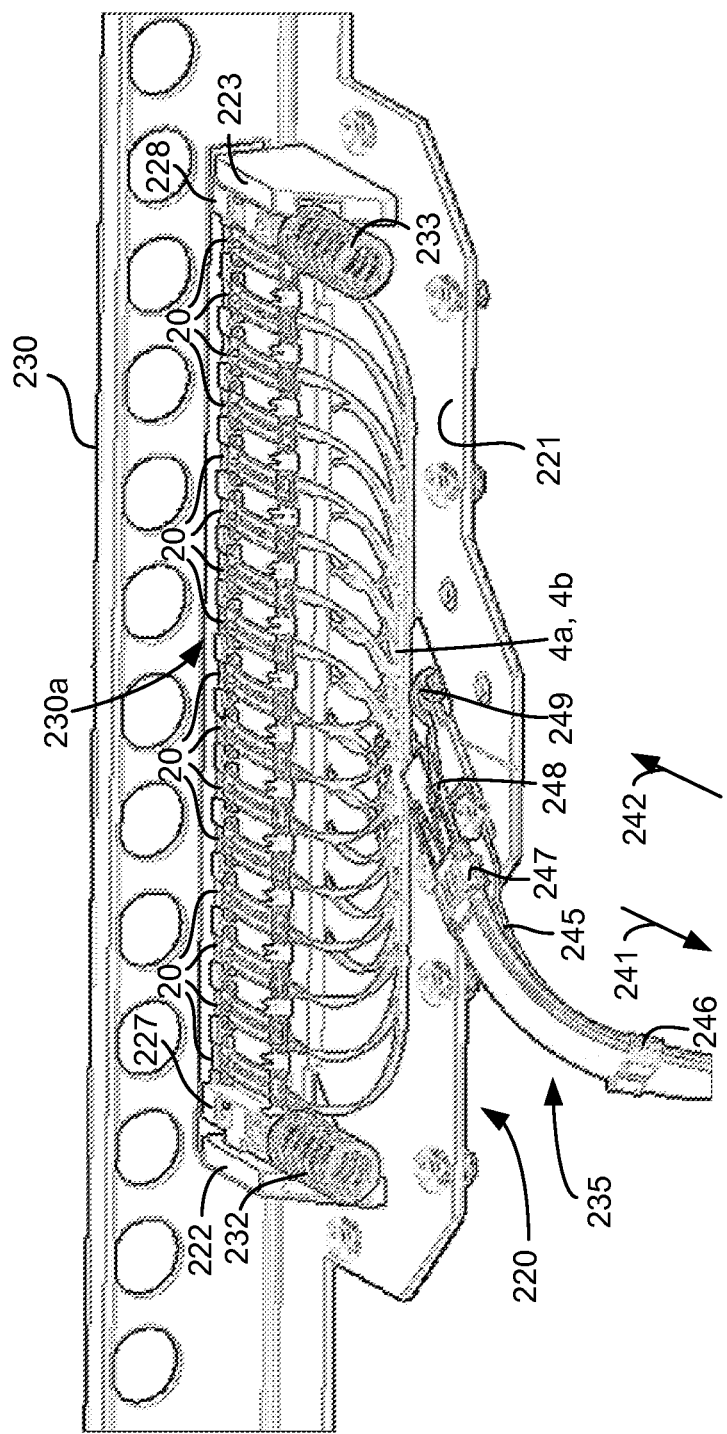
FIG. 11 illustrates a perspective view of the guide system and cross bar shown in FIG. 10, and further illustrates the holder shown in FIG. 8 with a 1×N array of the modules shown in FIG. 2 secured thereto.

FIG. 10 illustrates a perspective view of a guide system 220 attached to a cross bar 230 of a rack (not shown). The guide system 220 comprises a base 221 and first and second rail guides 222 and 223 mounted on the base 221. The rail guides 222 and 223 have slots 222a and 223a formed therein that are shaped and sized to engage rails 224 and 225 disposed on the first and second ends 205 and 206 (FIG. 8), respectively, of the holder 200 (FIG. 8). FIG. 11 illustrates a perspective view of the guide system 220 and cross bar 230 shown in FIG. 10, and further illustrates the holder 200 shown in FIG. 8 with a 1×N array of the modules 20 shown in FIG. 2 secured to the sockets 100 of the holder 200. With reference again to FIG. 8, the holder 200 has molded holes 227 and 228 formed on the first and second sides 205 and 206, respectively. The molded holes 227 and 228 are shaped and sized to mate with pins 427 and 428, respectively, of the holder 400 (FIG. 14) that mates with the holder 200, as will be described below in more detail with reference to FIGS. 14-15D.

Figure 12:
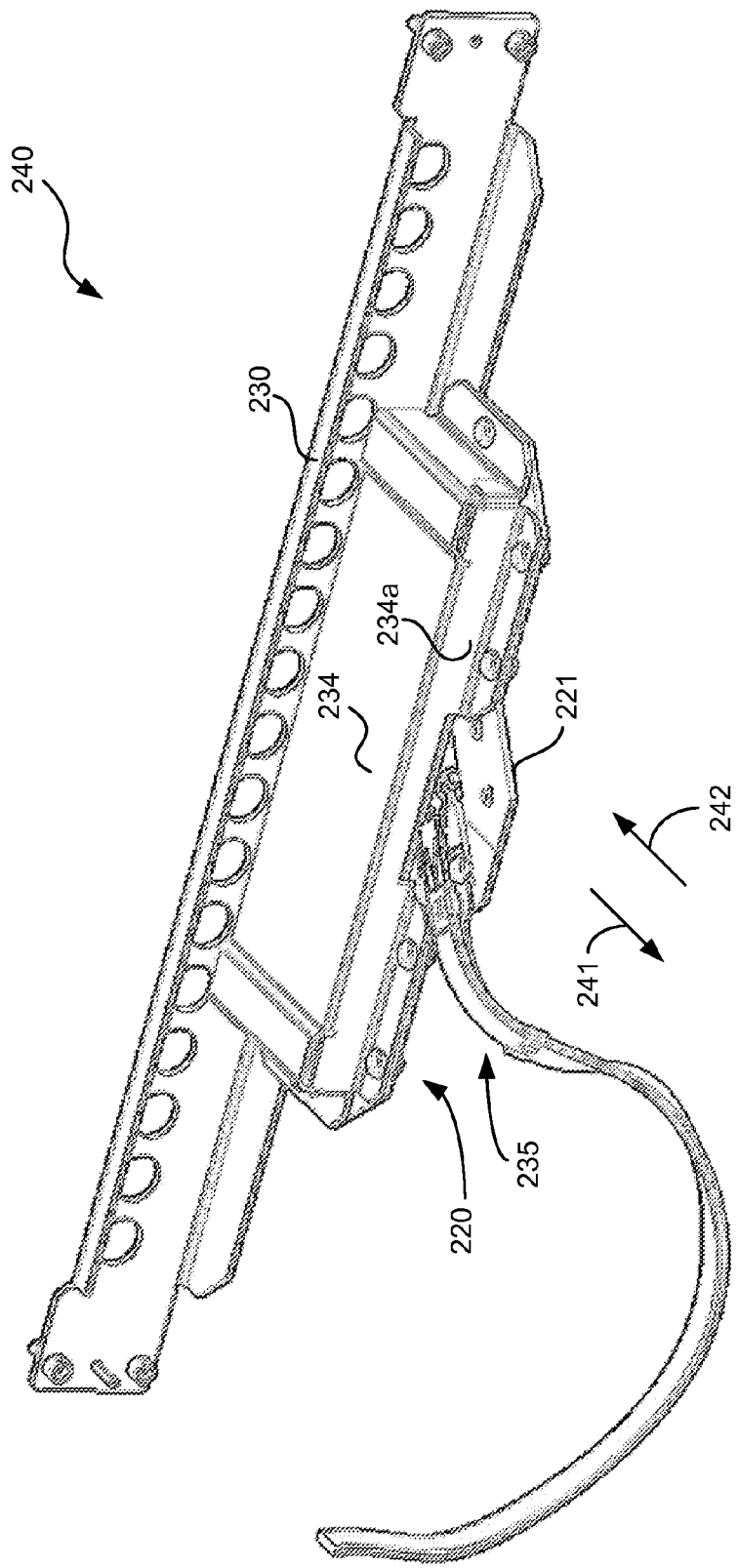
FIG. 12 illustrates a perspective view of an assembly that includes the guide system, the cross bar, the holder, and the 1×N array of the modules shown in FIG. 11, and that further includes a lid that is secured to a base of the guide system.
Figure 14:
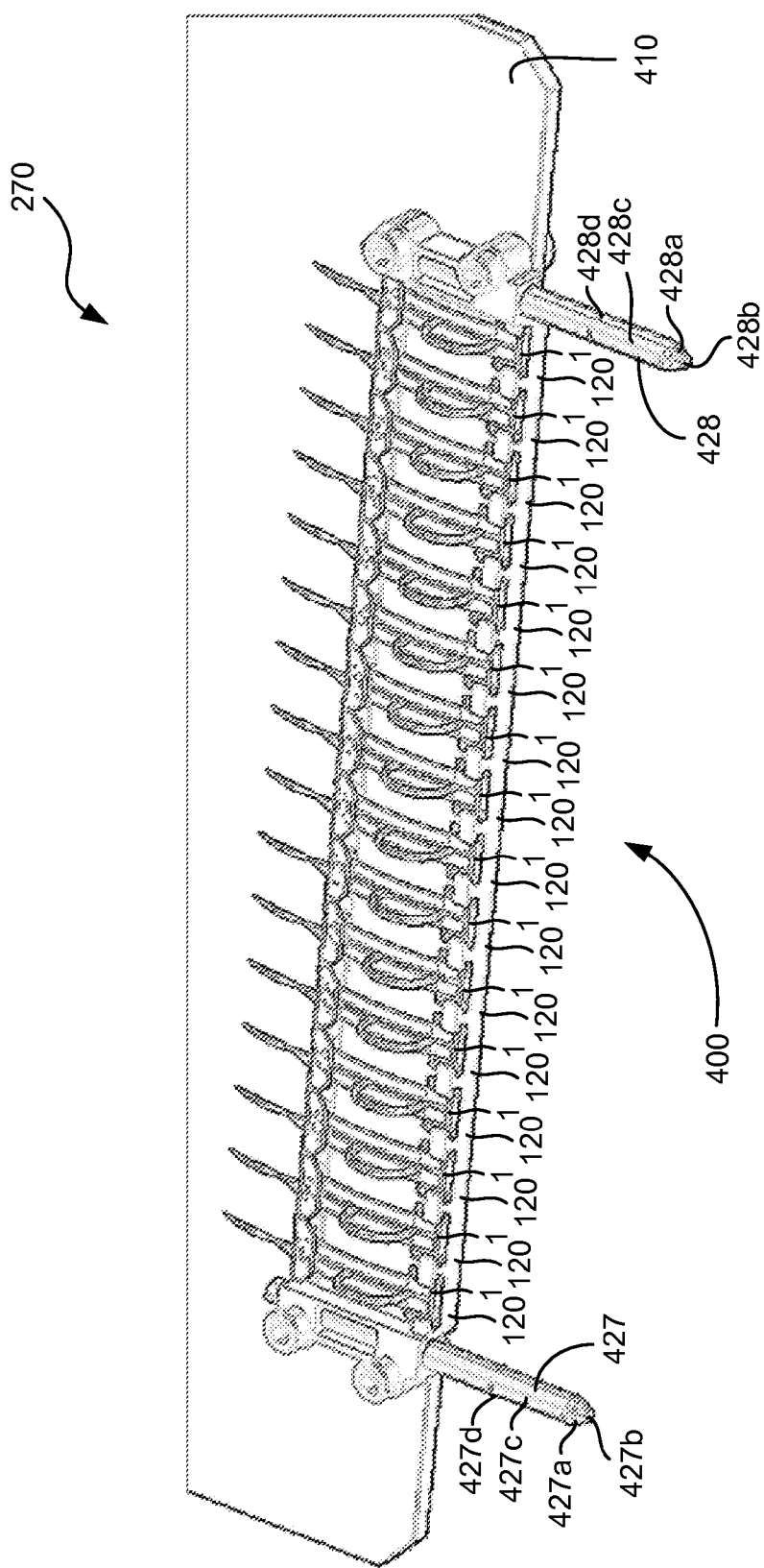
FIG. 14 illustrates a perspective view of an assembly that is housed within the server box, or enclosure, shown in FIG. 13 and that includes a holder, a PCB on which the holder is mounted, and a 1×N array of the modules shown in FIG. 1 mounted on the holder.

FIG. 12 illustrates a perspective view of an assembly 240 that includes the guide system 220, the cross bar 230, the holder 200 and the 1×N array of the modules 20 shown in FIG. 11, but further includes a lid 234 that is secured to the base 221 of the guide system 220. When the lid 234 is secured to the base 221 as shown in FIG. 12, the lid 234 and the base 221 encapsulate the holder 200 and the modules 20 and provide a housing for the holder 200 and the modules 20. With reference again to FIGS. 8 and 11, the enclosed ends 227a and 228a of the molded holes 227 and 228, respectively, are shaped and sized to fit inside of the ends of respective springs 232 and 233 (FIG. 11). When the lid 234 is secured to the base 221, as shown in FIG. 12, the opposite ends of the springs 232 and 233 are in abutment with the inner surface of the rear wall 234a (FIG. 10) of the lid 234. As will be described below in more detail with reference to FIG. 14, when the holder 400 shown in FIG. 14 is being mated with the holder 200 shown in FIG. 8, the force exerted by the holder 400 on the holder 200 causes the rails 224 and 225 (FIG. 8) of the holder 200 to ride within the slots 222a and 223a (FIG. 10), respectively, of the rail guides 222 and 223 (FIG. 8), respectively. This allows the holder 200 to move in the direction of arrow 241 (FIGS. 10-12) relative to the guide system 220. As the holder 200 moves in the direction of arrow 241, the springs 232 and 233 (FIG. 11) are further compressed against the inner surface of the rear wall 234a of the lid 234 (FIG. 12) such that the forces of the springs 232 and 233 attempt to urge the holder 200 in the opposite direction indicated by arrow 242. When the holder 400 shown in FIG. 14 is not applying a force in the direction of arrow 241 against the holder 200, the springs 232 and 233 urge the holder 200 in the direction indicated by arrow 242. This ensures that the 1×N array of modules 20 is centered within the opening 230a (FIG. 10) of the cross bar 230 when no contact or very little contact is being made between the holders 200 and 400.

As can be seen in FIG. 11, an optical fiber cable 235 contains the optical fiber cables 4a and 4b that contain the individual fibers 4 (FIG. 2) that are connected to the modules 20. The optical fiber cables 4a and 4b are typically ribbon cables, each of which contains eight optical fibers 4 such that each module 20 is connected to sixteen optical fibers 4. The optical fiber cable 235, in accordance with this illustrative embodiment, contains thirty-two of the optical fiber ribbon cables 4a and 4b. Due to the size of the cable 235, a conventional rubber strain relief device may not provide sufficient strain relief for the optical fibers 4. In accordance with an illustrative embodiment, a metal strain relief spring 245 is secured to the cable 235 by two copper swedge locks 246 and 247. The cable 235 includes Kevlar fibers 248 that are configured as tie offs 249 that are used to secure the Kevlar fibers 248 to a base portion of the swedge lock 247, which is secured to the base 221 of the holder 200.

Figure 13:
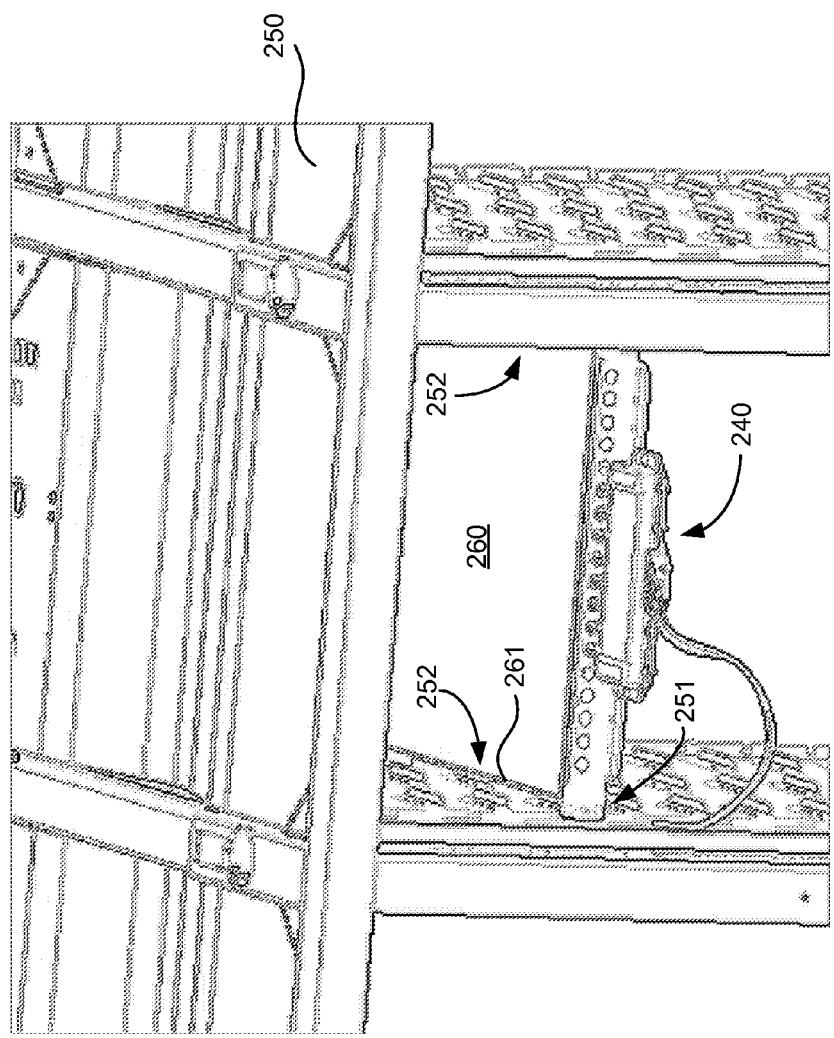
FIG. 13 illustrates a perspective view of the assembly shown in FIG. 12 secured to a rack and engaged with a server box, or enclosure, that is installed in the rack.

FIG. 13 illustrates a perspective view of the assembly 240 shown in FIG. 12 secured to a rack 250 and engaged with a server enclosure 260. FIG. 14 illustrates a perspective view of an assembly 270 that is housed within the server enclosure 260 shown in FIG. 13 and that includes the holder 400, a PCB 410 on which the holder 400 is mounted, and a 1×N array of the modules 1 shown in FIG. 1 mounted on the holder 400. In accordance with this illustrate embodiment, N=16. Similar to the holder 200 shown in FIG. 8, the holder 400 shown in FIG. 14 has the male sockets 120 (FIG. 5) of the array formed side by side in an upper mounting surface thereof. Like the holder 200 shown in FIG. 8, the holder 400 has a lower surface, first and second ends, a back side and a front side. The lower surface of the holder 400 is secured to the upper surface of the PCB 410. Each of the male sockets 120 formed on the upper surface of the holder 400 has one of the male modules/lenses 1 mounted thereon. The male sockets 120 shown in FIG. 14 are identical to the male sockets 120 shown in FIG. 5 except that the male sockets 120 shown in FIG. 14 do not include the tongues 121 that are included in the sockets 120 shown in FIG. 5.

When the server enclosure 260 (FIG. 13) is fully inserted into a slot 251 of the rack 250, guide rails 252 of the slot 251 engage opposite sides 261 of the server enclosure 260 to guide the server enclosure 260 into a fully-engaged position with the assembly 240. In this fully-engaged position, the guide pins 427 and 428 (FIG. 14) of the holder 400 are fully mated with the molded holes 227 and 228 (FIG. 8), respectively, of the holder 200. The full mating of the pins 427 and 428 with the holes 227 and 228, respectively, results in the pins 10 of the male modules 1 (FIG. 1) fully mating with the openings 21 of the female modules 20 (FIG. 2), as will now be described with reference to FIGS. 15A-15D.

FIGS. 15A-15D illustrate top perspective views of the molded hole 227 of the holder 200 shown in FIG. 8 being mated with the pin 427 of the holder 400 shown in FIG. 14 at various stages of the mating process. The molded hole 228 mates with the pin 428 in the same manner as the molded hole 227 mates with the pin 427, but only the mating of the molded hole 227 with the pin 427 is shown in FIGS. 15A-15D. With reference again to FIG. 14, the pins 427 and 428 have end portions 427a and 428a, respectively, that are tapered such that the diameter of the pins 427 and 428 changes from a smaller diameter at the tips 427b and 428b to larger, constant-width portions 427c and 428c in the direction moving away from the tips 427b and 428b toward the PCB 410. The surfaces of the end portions 427a and 428a are smooth and continuous from the tips 427b and 428b to the constant-width portions 427c and 428c, respectively. The sides 427d and 428d of the pins 427 and 428, respectively, are relieved along the larger, constant-width portions 427c and 428c to provide a relaxed tolerance in the Y direction in what would otherwise be an over-constrained system without the reliefs. Pin 427 fixes the mate in the Y and Z directions. Pin 428 fixes the rotation about pin 427 by fixing the location in the Z direction.

Figure 15A:
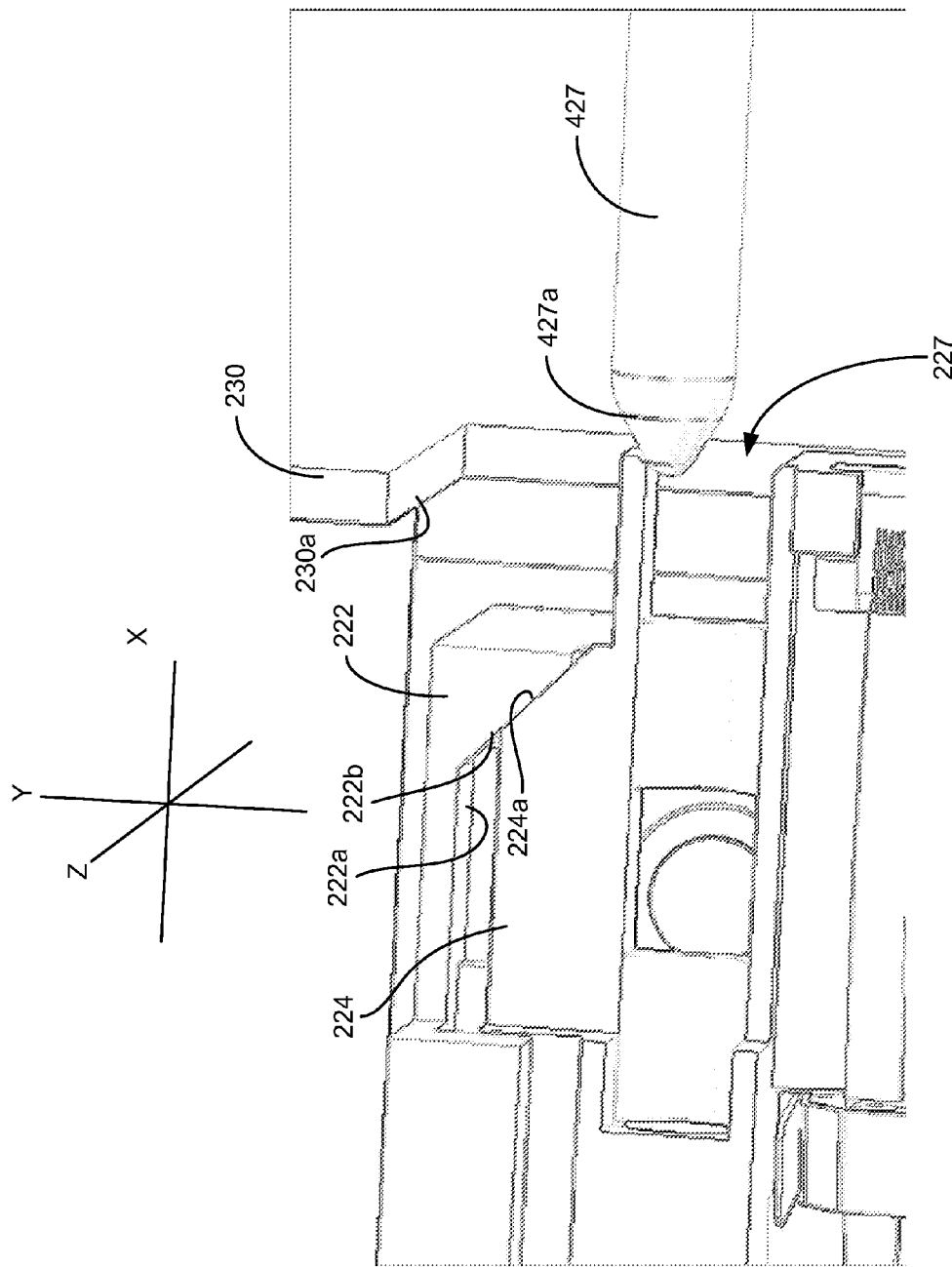
Figure 15B:
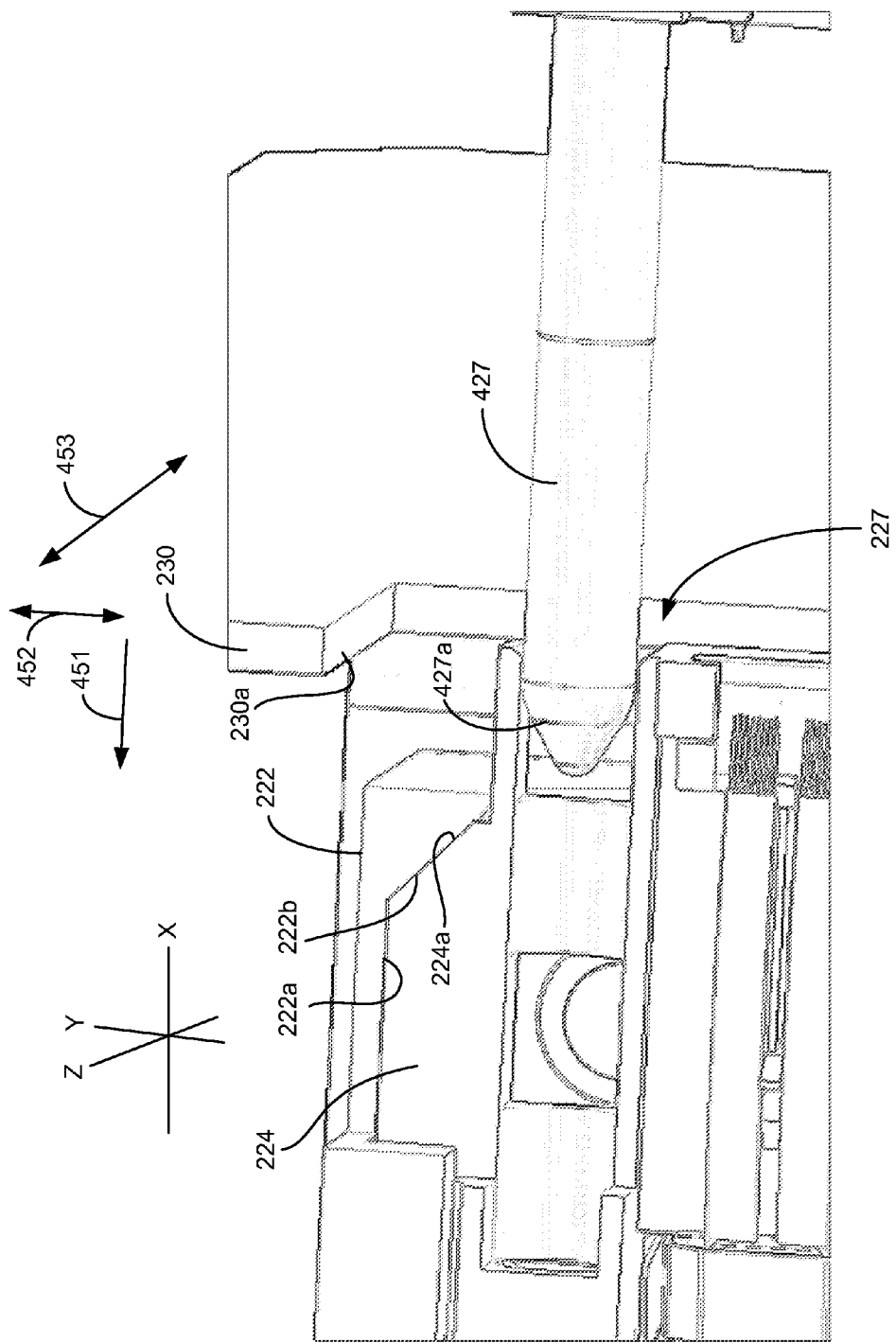

With reference to FIG. 15A, it can be seen that the tapering of the end portion 427a of the pin 427 and the smooth, continuous surface of the end portion 427a ensure that the pin 427 will enter the respective hole 227 of the holder 200 even if there is some amount of misalignment between the pin 427 and the hole 227. For example, in the illustrative embodiment, misalignment between the pin 427 and the hole 227 of not more than 62 mils in the X, Y or Z dimensions will result in the pin 427 entering the hole as the pin 427 continues to be advanced forward in the X direction, as shown in FIG. 15B. Thus, in accordance with this illustrative embodiment, as long as the guide rails 252 of the rack 250 (FIG. 13) guide the server enclosure 260 into engagement with the assembly 240 such that misalignment between the pins 427 and 428 and the holes 227 and 228, respectively, is not more than allowable misalignment tolerance in any direction, the pins 427 and 428 will mate with the holes 227 and 228, respectively.

The partial mating of the pins 427 and 428 with the holes 227 and 228, as shown in FIG. 15C, brings the respective modules 1 and 20 into coarse alignment with one another within a misalignment tolerance that will allow the pins 10 of the modules 1 to engage the openings 21 of the modules 20. Once the modules 1 and 20 start to engage one another within the allowable misalignment tolerance, relative movement of the modules 1 and 20 toward one another in the X directions will ultimately result in the modules 1 and 20 being placed in the fully-mated state shown in FIG. 15D. Therefore, once the pins 10 begin to engage the openings 21, continued advancement of the pins 427 and 428 into the holes 227 and 228, respectively, will result in full mating of the modules 1 and 20.

As indicated above with reference to FIGS. 10-12, the springs 232 and 233 bias the holder 200 forward in the direction of arrow 242 relative to the guide system 220. When no contact is being made between the holders 200 and 400, the forces exerted by the springs 232 and 233 have the effect of centering the holder 200 within the opening 230a formed in the cross bar 230. The rails 224 and 225 of the holder 200 have slanted surfaces 224a and 225a (FIG. 8), respectively, that engage slanted surfaces 222b and 223b (FIG. 10) of the slots 222a and 223a, respectively, of the rail guides 222 and 223, respectively. The manner in which the slanted surfaces 224a and 222b engage one another can be seen in FIGS. 15A-15D.

When the holders 200 and 400 are exerting very little or no force on one another, the engagement of the slanted surfaces 222b and 224a with one another in combination with the forces exerted by the springs 232 and 233 on the holder 200 cause the holder 200 to be centered within the opening 230a of the cross bar 230, as depicted in FIG. 15A. As the forces exerted by the holders 200 and 400 on one another increases as the pins 427 and 428 advance forward within the holes 227 and 228, respectively, the slanted surface 224a of the rail 224 slides along the slanted surface 222b of the slot 222a until the rail 224 is in the position within the slot 222a shown in FIG. 15B. This sliding action allows the holder 200 to float to a limited extent relative to the guide system 220 (FIG. 10) in the X, Y and Z directions, as the pins 427 and 428 are engaging the holes 227 and 228, respectively, which helps the pins 427 and 428 blindly mate with the holes 227 and 228, respectively.

Once the rail 224 is in the position within the slot 222a depicted in FIG. 15B, certain surfaces (not shown) of the rail 224 and of the slot 222a are in abutment with one another to prevent further movement of the holder 200 relative to the guide system 220 (FIG. 10) in the X, Y and Z directions indicated by arrows 451, 452 and 453, respectively. Once in the holders 200 and 400 are in the positions indicated in FIG. 15B, continued advancement of the pin 427 within the hole 227 will bring the holders 200 and 400 and the modules 1 and 20 into the fully-mated state depicted in FIG. 15D. When the holders 200 and 400 are in the fully-mated state depicted in FIG. 15D, the modules 1 and 20 are also in the fully-mated state such that their respective optical pathways are precisely aligned with one another, as described above with reference to FIGS. 1-7.

It can be seen from the above description that merely installing the server enclosure 260 in the rack 250 will result in the modules 20 held by the holder 200 blindly mating with the respective modules 1 held by the holder 400, provided that installation of the server enclosure 260 in the rack 250 brings the pins 427 and 428 within the allowable misalignment tolerance of the holes 227 and 228, respectively. As will be understood by persons of skill in the art, server enclosures and racks are capable of being manufactured that will ensure that the holders 200 and 400 are brought within the exemplary allowable misalignment tolerances discussed above with reference to FIGS. 8-15D. Of course, the invention is not limited to the allowable misalignment tolerance examples discussed herein because such tolerances depend on many factors that can vary, as will be understood by those of skill in the art.

It should be noted that the invention has been described with reference to illustrative, or exemplary, embodiments in order to demonstrate the principles and concepts of the invention. As will be understood by those of skill in the art, the invention is not limited to the illustrative embodiments described herein. For example, the features that allow the floating aspects to be achieved are not limited to the features that have been described herein. Persons skilled in the art will understand, in view of the description provided herein, that a variety of mechanism can be used to achieve the floating aspects described herein. Persons skilled in the art will understand the manner in which these and other modifications may be made to the embodiments described herein and that all such modifications are within the scope of the invention.

What is claimed is:

1. An apparatus for holding a first array of first multi-optical fiber connector modules in a floating arrangement that facilitates blind mating of the first array of first multi-optical fiber connector modules with a second array of second multi-optical fiber connector modules, the apparatus comprising:

a guide system;

a first holder movably secured to the guide system such that the first holder has limited freedom of movement relative to the guide system in at least one predetermined direction, the first holder having at least a first end, a second end, a front side, a back side, an upper surface and a lower surface, the first holder having at least a first holder mating feature; and a first 1-by-N array of first multi-optical fiber connector modules, where N is a positive integer that is equal to or greater than two, each of the first multi-optical fiber connector modules held in N respective sockets disposed on the upper surface of the first holder, each socket holding a respective first multi-optical fiber connector module in a floating arrangement that allows each respective first multi-optical fiber connector module to have a limited freedom of movement relative to each respective socket, each of the first multi-optical fiber connector modules having at least a first passive fine alignment feature adapted to mate with a second passive fine alignment feature of a respective second multi-optical fiber connector module of a second 1-by-N array of second multi-optical fiber connector modules mounted on an upper surface of a second holder, the second holder having a second holder mating feature that is adapted to mate with the first holder mating feature of the first holder, and wherein partial mating of the first and second holder mating features with one another brings the first and second passive fine alignment features of the respective first and second multi-optical fiber connector modules into coarse alignment with one another within a predetermined allowable misalignment tolerance between the respective first and second multi-optical fiber connector modules that ensures that full mating of the first and second holder mating features with one another results in the full mating of the first and second passive fine alignment features of the respective first and second multi-optical fiber connector modules with one another, and wherein the full mating of the first and second passive fine alignment features of the respective first and second multi-optical fiber connector modules with one another precisely aligns respective optical pathways of the respective first multi-optical fiber connector module with respective optical pathways of the respective second multi-optical fiber connector module.

2. The apparatus of claim 1, wherein the first holder is held in a floating arrangement on the guide system that provides the first holder with the limited freedom of movement relative to the guide system, and wherein the floating arrangement ensures that when the first and second holder mating features are brought together within a predetermined allowable misalignment tolerance between the first and second holders, the first and second holder mating features will engage one another to achieve at least the partial mating of the first and second holder mating features with one another.

3. The apparatus of claim 1, wherein the floating arrangement includes respective pairs of arms disposed on a front end of each socket that engage the respective first connector module and a respective spring in contact with the respective socket that applies a force to the respective first connector module, and wherein the force applied by the respective spring urges the respective connector module into the respective pair of arms.

4. The apparatus of claim 3, wherein each pair of arms is made up of first and second arms having first and second inner walls, respectively, that are complementary in shape to first and second features, respectively, formed on opposite sides of the first connector modules, and wherein when the first and second inner walls are engaged with the first and second features, respectively, formed on the opposite sides of the respective first connector module, some space exists in between the first and second inner walls and the first and second features, respectively, formed on the opposite sides of the respective first connector module, and wherein the space provides the respective first connector module with freedom to move to a limited extent relative to the respective first socket, and wherein the freedom of movement of the respective first connector module relative to the respective socket in combination with the spring force applied to the respective first connector module provides the floating arrangement that allows the respective first connector module to have a limited freedom of movement relative to the respective socket.

5. The apparatus of claim 1, further comprising:
N first cleave holders mounted on the respective N first sockets, the cleave holders being adapted to clamp respective optical fiber cables that contain optical fibers that are attached on ends thereof to the respective N first connector modules, wherein the cleave holders are adapted to provide strain relief for the respective optical fibers of the respective optical fiber cables.

6. The apparatus of claim 1, wherein the first holder mating feature comprises at least first and second holes formed in the first holder, and wherein the second holder mating feature comprises at least first and second pins disposed on the second holder, wherein at least portions of outer surfaces of the first and second pins are complementary in shape and size to a shape and size of at least portions of inner surfaces of the first and second holes to enable the first and second pins to mate with the first and second holes, respectively.

7. The apparatus of claim 6, wherein proximal ends of the first and second pins are in contact with the respective second holder and wherein distal ends of the first and second pins are tapered such that widths of the first and second pins increase in a direction from tips of the distal ends of the first and second pins toward the proximal ends of the first and second pins.

8. The apparatus of claim 7, wherein the first passive fine alignment feature comprises at least first and second openings formed in the first connector module, and wherein the second passive fine alignment feature comprises at least first and second pins disposed on the second connector module, wherein at least portions of outer surfaces of the first and second pins of the second connector module are complementary in shape and size to a shape and size of at least portions of inner surfaces of the first and second openings formed in the first connector module to enable the first and second pins of the second connector module to mate with the first and second openings of the first connector module, respectively.

9. The apparatus of claim 8, wherein proximal ends of the first and second pins of the second connector module are in contact with the respective second connector module and wherein distal ends of the first and second pins of the second connector module are tapered such that widths of the first and second pins of the second connector module increase in a direction from tips of the distal ends of the first and second pins of the second connector module toward the proximal ends of the first and second pins of the second connector module.

10. The apparatus of claim 7, wherein the second passive fine alignment feature comprises at least first and second openings formed in the second connector module, and wherein the first passive fine alignment feature comprises at least first and second pins disposed on the first connector module, wherein at least portions of outer surfaces of the first and second pins of the first connector module are complementary in shape and size to a shape and size of at least portions of inner surfaces of the first and second openings formed in the second connector module to enable the first and second pins of the first connector module to mate with the first and second openings of the second connector module, respectively.

11. The apparatus of claim 10, wherein proximal ends of the first and second pins of the first connector module are in contact with the respective first connector module and wherein distal ends of the first and second pins of the first connector module are tapered such that widths of the first and second pins of the first connector module increase in a direction from tips of the distal ends of the first and second pins of the first connector module toward the proximal ends of the first and second pins of the first connector module.

12. The apparatus of claim 1, further comprising:
a first structure, wherein the guide system is mounted on the first structure, the first structure having a first engagement mechanism that is adapted to mate with a second engagement mechanism of a second structure on which the second holder is mounted, and wherein when the first and second engagement mechanisms are fully engaged with one another, the full engagement of the first and second engagement mechanisms with one another causes the first and second holder mating features to fully mate with one another.

13. The apparatus of claim 12, wherein the first structure is a rack configured to hold a plurality of server enclosures in respective slots of the rack, and wherein the second structure is a respective server enclosure installed in a respective slot of the rack, and wherein the first engagement mechanism comprises one or more guide features of the respective slot and wherein the second engagement mechanism comprises one or more sides of the respective server enclosure.

14. The apparatus of claim 13, wherein the guide system is secured to a cross bar of the rack, the cross bar being disposed at a back end of the respective slot, and wherein the server enclosure is inserted into the respective slot through a front end of the respective slot.

15. The apparatus of claim 12, wherein the guide system comprises:
a base;
first and second rail guides secured to the base, the first and second rail guides having first and second slots formed therein, respectively, and wherein the first holder has first and second rails disposed on the first and second ends, respectively, of the first holder, and wherein the first rail is engaged with the first slot and wherein the second rail is engaged with the second slot, and wherein said limited freedom of movement of the first holder relative to the guide system is provided at least in part by an allowed limited movement of the first and second rails within the first and second slots, respectively, of the first and second rail guides, respectively;
a spring system that is in contact with the first holder and that exerts a force on the first holder, the spring system comprising one or more springs; and
a lid secured to the base, wherein the lid and the base provide a housing for the first holder and for the first 1-by-N array of first multi-optical fiber connector modules, and wherein the spring system is in contact with the housing, said one or more springs of the spring system exerting a force on the first holder that urges the first holder in a direction that is parallel to the first and second slots.

16. An apparatus for holding a first array of first multi-optical fiber connector modules in a floating arrangement that facilitates blind mating of the first array of first multi-optical fiber connector modules with a second array of second multi-optical fiber connector modules, the apparatus comprising:
a guide system;
a first holder fixedly secured to the guide system, the first holder having at least a first end, a second end, a front side, a back side, an upper surface and a lower surface, the first holder having at least a first holder mating feature, the first holder having a 1-by-N array of first sockets disposed on the upper surface of the first holder, where N is a positive integer that is equal to or greater than two; and
a first 1-by-N array of the first multi-optical fiber connector modules, wherein each of the first connector modules is held in a respective socket of the 1-by-N array of sockets in a floating arrangement that allows the respective first connector module to have limited freedom of movement relative to the respective socket, each of the first connector modules having at least a first passive fine alignment feature adapted to mate with a second passive fine alignment feature of a respective second multi-optical fiber connector module of a second 1-by-N array of second multi-optical fiber connector modules mounted on an upper surface of a second holder, the second holder having a second holder mating feature that is adapted to mate with the first holder mating feature, and wherein the full mating of the first and second holder mating features with one another results in the full mating of the first and second fine alignment features of the respective first and second multi-optical fiber connector modules with one another, and wherein the full mating of the first and second fine alignment features of the respective first and second multi-optical fiber connector modules with one another precisely aligns respective optical pathways of the respective first multi-optical fiber connector module with respective optical pathways of the respective second multi-optical fiber connector module.

17. The apparatus of claim 16, wherein the floating arrangement includes respective pairs of arms disposed on a front end of each socket that engage the respective first connector module and a respective spring in contact with the respective socket that applies a force to the respective first connector module, and wherein the force applied by the respective spring urges the respective first connector module into the respective pair of arms.

18. The apparatus of claim 16, wherein partial mating of the first and second holder mating features with one another brings the first and second passive fine alignment features of the respective first and second multi-optical fiber connector modules into coarse alignment with one another within a predetermined allowable misalignment tolerance between the respective first and second multi-optical fiber connector modules that ensures that full mating of the first and second holder mating features with one another results in full mating of the respective first and second passive fine alignment features with one another.

19. The system of claim 16, wherein the second holder is held in a floating arrangement on a guide system that provides the second holder with limited freedom of movement relative to the guide system, and wherein the floating arrangement ensures that when the first and second holder mating features are brought together within a predetermined allowable misalignment tolerance between the first and second holders, the first and second holder mating features will engage one another to achieve at least the partial mating of the first and second holder mating features with one another.

20. The apparatus of claim 17, wherein each pair of arms is made up of first and second arms having first and second inner walls, respectively, that are complementary in shape to first and second features, respectively, formed on opposite sides of the first connector modules, and wherein when the first and second inner walls are engaged with the first and second features, respectively, formed on the opposite sides of the respective first connector module, some space exists in between the first and second inner walls and the first and second features, respectively, formed on the opposite sides of the respective first connector module, and wherein the space provides the respective first connector module with freedom to move to a limited extent relative to the respective socket, and wherein the freedom of movement of the respective first connector module relative to the respective socket in combination with the spring force applied to the respective first connector module provides the floating arrangement that allows the respective first connector module to have a limited freedom of movement relative to the respective socket.

21. The apparatus of claim 16, further comprising:
N first cleave holders mounted on the respective N first sockets, the cleave holders being adapted to clamp respective optical fiber cables that contain optical fibers that are attached on ends thereof to the respective N first connector modules, wherein the cleave holders are adapted to provide strain relief for the respective optical fibers of the respective optical fiber cables.

22. The system of claim 16, wherein the second holder mating feature comprises at least first and second holes formed in the second holder, and wherein the first holder mating feature comprises at least first and second pins disposed on the first holder, wherein at least portions of outer surfaces of the first and second pins are complementary in shape and size to a shape and size of at least portions of inner surfaces of the first and second holes to enable the first and second pins to mate with the first and second holes, respectively.

23. The apparatus of claim 22, wherein proximal ends of the first and second pins are in contact with the respective first holder and wherein distal ends of the first and second pins are tapered such that widths of the first and second pins increase in a direction from tips of the distal ends of the first and second pins toward the proximal ends of the first and second pins.

24. The apparatus of claim 23, wherein the first passive fine alignment feature comprises at least first and second openings formed in the first connector module, and wherein the second passive fine alignment feature comprises at least first and second pins disposed on the second connector module, wherein at least portions of outer surfaces of the first and second pins of the second connector module are complementary in shape and size to a shape and size of at least portions of inner surfaces of the first and second openings formed in the first connector module to enable the first and second pins of the second connector module to mate with the first and second openings of the first connector module, respectively.

25. The apparatus of claim 24, wherein proximal ends of the first and second pins of the second connector module are in contact with the respective second connector module and wherein distal ends of the first and second pins of the second connector module are tapered such that widths of the first and second pins of the second connector module increase in a direction from tips of the distal ends of the first and second pins of the second connector module toward the proximal ends of the first and second pins of the second connector module.

26. The system of claim 23, wherein the second passive fine alignment feature comprises at least first and second openings formed in the second connector module, and wherein the first passive fine alignment feature comprises at least first and second pins disposed on the first connector module, wherein at least portions of outer surfaces of the first and second pins of the first connector module are complementary in shape and size to a shape and size of at least portions of inner surfaces of the first and second openings formed in the second connector module to enable the first and second pins of the first connector module to mate with the first and second openings of the second connector module, respectively.

27. The apparatus of claim 26, wherein proximal ends of the first and second pins of the first connector module are in contact with the respective first connector module and wherein distal ends of the first and second pins of the first connector module are tapered such that widths of the first and second pins of the first connector module increase in a direction from tips of the distal ends of the first and second pins of the first connector module toward the proximal ends of the first and second pins of the first connector module.

28. A system for blind mating multiple arrays of multi-optical fiber connector modules with one another, the system comprising:
a guide system;
a first holder movably secured to the guide system such that the first holder has limited freedom of movement relative to the guide system in at least one predetermined direction, the first holder having at least a first end, a second end, a front side, a back side, an upper surface and a lower surface, the first holder having at least a first holder mating feature;
a first 1-by-N array of first multi-optical fiber connector modules mounted on the upper surface of the first holder, where N is a positive integer that is equal to or greater than two, each of the first multi-optical fiber connector modules having at least a first passive fine alignment feature;
a second holder having at least a first end, a second end, a front side, a back side, an upper surface, and a lower surface, the second holder having at least a second holder mating feature that is mated with the first holder mating feature of the first holder; and
a second 1-by-N array of second multi-optical fiber connector modules mounted on the upper surface of the second holder, each of the second multi-optical fiber connector modules having at least a second passive fine alignment feature that is mated with the first fine alignment feature of a respective first multi-optical fiber connector module, and wherein the mating of the first and second fine alignment features of the respective first and second multi-optical fiber connector modules precisely aligns respective optical pathways of the respective first multi-optical fiber connector modules with respective optical pathways of the respective second multi-optical fiber connector modules.

29. The system of claim 28, wherein partial mating of the first and second holder mating features with one another brings the first and second passive fine alignment features of the respective first and second multi-optical fiber connector modules into coarse alignment with one another within a predetermined allowable misalignment tolerance between the respective first and second multi-optical fiber connector modules that ensures that full mating of the first and second holder mating features with one another results in full mating of the respective first and second passive fine alignment features with one another.

30. The system of claim 29, wherein the first holder is held in a floating arrangement on the guide system that provides the first holder with the limited freedom of movement relative to the guide system, and wherein the floating arrangement ensures that when the first and second holder mating features are brought together within a predetermined allowable misalignment tolerance, the first and second holder mating features will engage one another to achieve at least the partial mating of the first and second holder mating features with one another.

31. The system of claim 29, wherein the N first multi-optical fiber connector modules are held in N respective first sockets disposed on the upper surface of the first holder, and wherein the N second multi-optical fiber connector modules are held in N respective second sockets disposed on the upper surface of the second holder, and wherein each socket holds the respective multi-optical fiber connector module in a floating arrangement that allows the respective connector module to have a limited freedom of movement relative to the respective socket.

32. The system of claim 31, wherein the floating arrangement includes respective pairs of arms disposed on a front end of each socket that engage the respective connector module and a respective spring in contact with the respective socket that applies a force to the respective connector module, and wherein the force applied by the respective spring urges the respective connector module into the respective pair of arms.

33. The system of claim 32, wherein each pair of arms is made up of first and second arms having first and second inner walls, respectively, that are complementary in shape to first and second features, respectively, formed on opposite sides of the connector modules, and wherein when the first and second inner walls are engaged with the first and second features, respectively, formed on the opposite sides of the respective connector module, some space exists in between the first and second inner walls and the first and second features, respectively, and wherein the space provides the first and second features with freedom to move to a limited extent relative to the first and second inner walls, respectively, and wherein the freedom of movement of the first and second features relative to the first and second inner walls, respectively, in combination with the spring force applied to the respective connector module provides the respective connector module with said limited freedom of movement relative to the respective socket.

34. The system of claim 31, further comprising:
N first cleave holders mounted on the respective N first sockets, the cleave holders being adapted to clamp respective optical fiber cables that contain optical fibers that are attached on ends thereof to the respective N first connector modules, wherein the cleave holders are adapted to provide strain relief for the respective optical fibers of the respective optical fiber cables.

35. The system of claim 28, wherein the first holder mating feature comprises at least first and second holes formed in the first holder, and wherein the second holder mating feature comprises at least first and second pins disposed on the second holder, wherein at least portions of outer surfaces of the first and second pins are complementary in shape and size to a shape and size of at least portions of inner surfaces of the first and second holes to enable the first and second pins to mate with the first and second holes, respectively.

36. The system of claim 35, wherein proximal ends of the first and second pins are in contact with the respective second holder and wherein distal ends of the first and second pins are tapered such that widths of the first and second pins increase in a direction from tips of the distal ends of the first and second pins toward the proximal ends of the first and second pins.

37. The system of claim 36, wherein the first passive fine alignment feature comprises at least first and second openings formed in the first connector module, and wherein the second passive fine alignment feature comprises at least first and second pins disposed on the second connector module, wherein at least portions of outer surfaces of the first and second pins of the second connector module are complementary in shape and size to a shape and size of at least portions of inner surfaces of the first and second openings formed in the first connector module to enable the first and second pins of the second connector module to mate with the first and second openings of the first connector module, respectively.

38. The system of claim 37, wherein proximal ends of the first and second pins of the second connector module are in contact with the respective second connector module and wherein distal ends of the first and second pins of the second connector module are tapered such that widths of the first and second pins of the second connector module increase in a direction from tips of the distal ends of the first and second pins of the second connector module toward the proximal ends of the first and second pins of the second connector module.

39. The system of claim 36, wherein the second passive fine alignment feature comprises at least first and second openings formed in the second connector module, and wherein the first passive fine alignment feature comprises at least first and second pins disposed on the first connector module, wherein at least portions of outer surfaces of the first and second pins of the first connector module are complementary in shape and size to a shape and size of at least portions of inner surfaces of the first and second openings formed in the second connector module to enable the first and second pins of the first connector module to mate with the first and second openings of the second connector module, respectively.

40. The system of claim 39, wherein proximal ends of the first and second pins of the first connector module are in contact with the respective first connector module and wherein distal ends of the first and second pins of the first connector module are tapered such that widths of the first and second pins of the first connector module increase in a direction from tips of the distal ends of the first and second pins of the first connector module toward the proximal ends of the first and second pins of the first connector module.

41. The system of claim 28, further comprising:
a first structure, wherein the guide system is mounted on the first structure, the first structure having a first engagement mechanism; and
a second structure, wherein the second holder is mounted on the second structure, the second structure having a second engagement mechanism, and wherein the first and second engagement mechanisms are fully engaged with one another, and wherein the full engagement of the first and second engagement mechanisms with one another causes the first and second holder mating features to fully mate with one another, and wherein the full mating of the first and second holder mating features with one another causes the first and second passive fine alignment features of the N first connector modules and of the N second connector modules to fully mate with one another.

42. The system of claim 41, wherein the first structure is a rack configured to hold a plurality of server enclosures in respective slots of the rack, and wherein the second structure is a respective server enclosure installed in a respective slot of the rack, and wherein the first engagement mechanism comprises one or more guide features of the respective slot and wherein the second engagement mechanism comprises one or more sides of the respective server enclosure.

43. The system of claim 42, wherein the guide system is secured to a cross bar of the rack, the cross bar being disposed at a back end of the respective slot, and wherein the server enclosure is inserted into the respective slot through a front end of the respective slot.

44. The system of claim 41, wherein the guide system comprises:
   a base;
   first and second rail guides secured to the base, the first and second rail guides having first and second slots formed therein, respectively, and wherein the first holder has first and second rails disposed on the first and second ends, respectively, of the first holder, and wherein the first rail is engaged with the first slot and wherein the second rail is engaged with the second slot, and wherein said limited freedom of movement of the first holder relative to the guide system is provided at least in part by an allowed limited movement of the first and second rails within the first and second slots, respectively, of the first and second rail guides, respectively;
   a spring system that is in contact with the first holder and that exerts a force on the first holder, the spring system comprising one or more springs; and
   a lid secured to the base, wherein the lid and the base provide a housing for the first holder and for the first 1-by-N array of first multi-optical fiber connector modules, and wherein the spring system is in contact with the housing, said one or more springs of the spring system exerting a force on the first holder that urges the first holder in a direction that is parallel to the first and second slots.

45. A method for blind mating multiple arrays of multi-optical fiber connector modules with one another, the system comprising:
   providing a first structure having a first holder movably secured thereto via a guide system that provides the first holder with limited freedom of movement relative to the guide system in at least one predetermined direction, the first structure having a first engagement mechanism, the first holder having at least a first holder mating feature, the first holder having a first 1-by-N array of first multi-optical fiber connector modules mounted on an upper surface thereof, where N is a positive integer that is equal to or greater than two, each of the first multi-optical fiber connector modules having at least a first passive fine alignment feature;
   providing a second structure having a second holder secured thereto, the second structure having a second engagement structure, the second holder having a second 1-by-N array of second multi-optical fiber connector modules mounted on an upper surface thereof, each of the second multi-optical fiber connector modules having at least a second passive fine alignment feature; and
   engaging the first and second structures with one another such that the first and second engagement mechanisms are fully engaged with one another, and wherein the full engagement of the first and second engagement mechanisms with one another causes the first and second holder mating features to fully mate with one another, and wherein the full mating of the first and second holder mating features with one another causes the first and second passive fine alignment features of the N first connector modules and of the N second connector modules to fully mate with one another, and wherein the full mating of the first and second passive fine alignment features with one another precisely aligns respective optical pathways of the respective first multi-optical fiber connector modules with respective optical pathways of the respective second multi-optical fiber connector modules.

46. The method of claim 45, wherein partial mating of the first and second holder mating features with one another brings the first and second passive fine alignment features of the respective first and second multi-optical fiber connector modules into coarse alignment with one another within a predetermined allowable misalignment tolerance between the respective first and second multi-optical fiber connector modules that ensures that full mating of the first and second holder mating features with one another results in full mating of the respective first and second passive fine alignment features with one another.

47. The method of claim 45, wherein the first structure is a rack configured to hold a plurality of server enclosures in respective slots of the rack, and wherein the second structure is a respective server enclosure, and wherein the step of engaging the first and second structures with one another comprises installing the server enclosure in a respective slot of the rack, and wherein the first engagement mechanism comprises one or more guide features of the respective slot and wherein the second engagement mechanism comprises one or more sides of the respective server enclosure.

* * * * *